US009838398B2

(12) United States Patent
Barton et al.

(10) Patent No.: US 9,838,398 B2
(45) Date of Patent: *Dec. 5, 2017

(54) VALIDATING THE IDENTITY OF AN APPLICATION FOR APPLICATION MANAGEMENT

(71) Applicant: Citrix Systems, Inc., Fort Lauderdale, FL (US)

(72) Inventors: Gary Barton, Boca Raton, FL (US); Zhongmin Lang, Parkland, FL (US); James Robert Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/006,348

(22) Filed: Jan. 26, 2016

(65) Prior Publication Data

US 2016/0142418 A1    May 19, 2016

Related U.S. Application Data

(63) Continuation of application No. 13/898,167, filed on May 20, 2013, now Pat. No. 9,270,674.
(Continued)

(51) Int. Cl.
*G06F 21/00* (2013.01)
*H04L 29/06* (2006.01)
(Continued)

(52) U.S. Cl.
CPC ............ *H04L 63/102* (2013.01); *G06F 21/33* (2013.01); *G06F 21/44* (2013.01); *G06F 21/51* (2013.01);
(Continued)

(58) Field of Classification Search
CPC ........ G06F 21/44; G06F 21/445; G06F 21/45; G06F 21/51; G06F 21/64
See application file for complete search history.

(56) References Cited

U.S. PATENT DOCUMENTS

| 5,870,467 A | 2/1999 | Imai et al. |
| 7,146,498 B1 | 12/2006 | Takechi et al. |

(Continued)

FOREIGN PATENT DOCUMENTS

| EP | 2 574 089 A1 | 3/2013 |
| JP | 8-137686 A | 5/1996 |

(Continued)

OTHER PUBLICATIONS

May 4, 2017—(EP) Extended European Search Report—App 17154058.6.

*Primary Examiner* — Edward Zee
(74) *Attorney, Agent, or Firm* — Banner & Witcoff, Ltd.

(57) ABSTRACT

A method of managing access to enterprise resources is provided. An access manager may operate at a mobile device to validate a mobile application installed at that mobile device. If the access manager does not successfully validate the mobile application, the access manager may prevent the mobile application from accessing computing resource. If the access manager does successfully validate the mobile application, then the access manager may identify the mobile application as a trusted mobile application. The access manager may thus permit the trusted mobile application to access the computing resource.

20 Claims, 14 Drawing Sheets

Related U.S. Application Data

(60) Provisional application No. 61/806,557, filed on Mar. 29, 2013.

(51) Int. Cl.
    *G06F 21/44*     (2013.01)
    *H04W 12/06*     (2009.01)
    *H04W 12/08*     (2009.01)
    *G06F 21/33*     (2013.01)
    *G06F 21/51*     (2013.01)
    *G06F 21/53*     (2013.01)

(52) U.S. Cl.
CPC .............. *G06F 21/53* (2013.01); *H04L 63/10* (2013.01); *H04W 12/06* (2013.01); *H04W 12/08* (2013.01); *G06F 2221/033* (2013.01); *G06F 2221/2103* (2013.01); *G06F 2221/2115* (2013.01)

(56) References Cited

U.S. PATENT DOCUMENTS

| | | | |
|---|---|---|---|
| 8,245,285 B1 * | 8/2012 | Ravishankar | G06F 21/77 726/9 |
| 2004/0162989 A1 | 8/2004 | Kirovski | |
| 2005/0132083 A1 * | 6/2005 | Raciborski | G06F 21/10 709/232 |
| 2005/0216422 A1 | 9/2005 | Lotspiech et al. | |
| 2006/0130123 A1 | 6/2006 | Andreev et al. | |
| 2007/0179907 A1 | 8/2007 | Waris | |
| 2008/0070686 A1 | 3/2008 | Satsukawa et al. | |
| 2008/0263630 A1 | 10/2008 | Harada et al. | |
| 2009/0293118 A1 * | 11/2009 | Yan | G06F 21/12 726/19 |
| 2010/0191974 A1 | 7/2010 | Dubhashi et al. | |
| 2011/0099248 A1 | 4/2011 | Uchida | |
| 2012/0198553 A1 | 8/2012 | Suginaka et al. | |
| 2012/0297457 A1 | 11/2012 | Schulte et al. | |

FOREIGN PATENT DOCUMENTS

| | | |
|---|---|---|
| JP | 2000-242491 A | 9/2000 |
| JP | 2007-11556 A | 1/2007 |
| JP | 2011-523481 A | 8/2011 |
| JP | 2013-5220 A | 1/2013 |
| WO | 2008070686 A2 | 6/2008 |
| WO | 2009142689 A1 | 11/2009 |
| WO | 2009157493 A1 | 12/2009 |
| WO | 2011030455 A1 | 3/2011 |

\* cited by examiner

VALIDATING THE IDENTITY OF AN APPLICATION FOR APPLICATION MANAGEMENT

CROSS-REFERENCE TO RELATED APPLICATIONS

This application is a continuation of U.S. patent application Ser. No. 13/898,167, entitled "Validating the Identity of a Mobile Application for Mobile Application Management" and filed on May 20, 2013, which claims priority to U.S. Provisional Pat. App. No. 61/806,557 entitled "Systems and Methods for Enterprise Mobility Management" and filed on Mar. 29, 2013, each of which is incorporated by reference herein in its entirety.

TECHNICAL FIELD

Aspects described herein generally relate to management of mobile applications at mobile computing devices. More specifically, various aspects provide approaches to validating a mobile application operating at an unmanaged device and controlling execution of that mobile application.

BACKGROUND

The use of mobile computing devices continues to grow. In particular, business and other enterprises have come to rely on mobile computing devices to allow individuals to remotely access various computing resources. Such resources may include, for example, electronic mail services, file services, data, and other electronic resources provided by the computer systems of an enterprise or the mobile device itself.

Whether an individual is located locally or remotely relative to computing resources, an enterprise may seek to protect and control access to those resources. Accordingly, an enterprise may implement various technological mechanisms (e.g., gateways and firewalls) as well as access control mechanisms (e.g., user authentication and authorization) in order to ensure an individual can only access the resources that individual is authorized and entitled to access. Such mechanisms may also prevent unauthorized individuals from accessing any of the computing resources.

With respect to mobile devices, an enterprise may employ various approaches to control remote access to computing resources from those mobile devices. This endeavor may be referred to as mobile device management. In one approach, an enterprise may provide an individual with a company-owned and company-controlled mobile device. Such a device may be configured such that the enterprise has control over the configuration, functionality, operation, and data of the mobile device. In this regard, the company-controlled mobile device may be referred to as a managed device. The enterprise may remotely control the managed device via, e.g., a client-server architecture. An enterprise server may remotely issue commands to a client application residing at the managed device. Such commands may include, e.g., installing new applications or functionality, updating existing applications or functionality, updating configuration settings, providing data, and so forth. If the managed device is lost or stolen, the enterprise may issue commands to lock or wipe the device in order to prevent an unauthorized individual from gaining access to the device or from gaining access to the resources via the device.

Individuals, however, may find it inconvenient to maintain both a company-owned mobile device as well as a personal mobile device. Instead, individuals may prefer to access the resources from their personal mobile devices. This practice may be referred to as BYOD, bring-your-own-device. Because these personal devices may not be company-controlled, such personal devices may be referred to as unmanaged devices. To accommodate this preference, solutions to allow unmanaged devices to access these resources are currently in development.

For example, providing a company-controlled mobile application, a managed mobile application, that is configured to operate at an unmanaged device is one approach currently in development. However, challenges remain. For managed mobile applications operating on an unmanaged device to be a viable approach, mechanisms to prevent unauthorized access to or use of resources via the managed mobile application may be needed. In particular, there exists a need to validate the identity of a managed mobile application to ensure the managed mobile application has been altered to circumvent the security mechanisms that protect the resources. In addition, there exists a need to control the operation of the managed mobile application at the unmanaged mobile device.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards controlling access to remote computing resources located at an enterprise computing system using managed mobile applications at mobile computing devices. In addition, aspects of the present disclosure are directed towards controlling access to local computing resources at the mobile computing devices themselves. An access manager may perform a validation process that determines whether a mobile application requesting access to computing resources has accurately identified itself and has not been subsequently altered after installation at the mobile computing device. In this way, the access manager may ensure the mobile application requesting access to the computing resource can be trusted and is not attempting to circumvent the security mechanisms used to protect those resources. As a result, individuals associated with the enterprise may advantageously utilize remote and local computing resources with their personal mobile devices.

A first aspect described herein provides a method of managing access to computing resources. An access manager may operate at a mobile device to validate a mobile application installed at that mobile device. If the access manager does not successfully validate the mobile application, the access manager may prevent the mobile application from accessing a computing resource. If the access manager does successfully validate the mobile application, then the access manager may identify the mobile application as a trusted mobile application. The access manager may thus permit the trusted mobile application to access the computing resource.

A second aspect described herein provides a mobile computing device. The mobile computing device may include a mobile application configured to access a computing resource, stored identification information associated with the mobile application, and an access manager. The access manager may be configured to validate the mobile application and prevent or permit access to the computing resource as described above.

A third aspect described herein provides an access manager configured to operate at a mobile device. The access manager may also be configured to validate a mobile application at the mobile device and prevent or permit access to a computing resource via the mobile application as described above. The access manager may further be configured to control operation of the mobile application based on an application policy stored at the mobile application.

Some aspects described herein provide that the stored identification information may be an original digital certificate associated and created along with the mobile application. The access manager may validate the mobile application by comparing the original digital certificate created for the mobile application with a digital certificate received from a mobile operating system at the mobile computing device. The computing resources may be located locally or remotely relative to the mobile computing device. Examples of computing resources include a software application operating at the mobile computing device or a remote computing system, a service provided by the mobile computing device or a remote computing system, data stored at the mobile computing device or the remote computing system, hardware at the mobile computing device or the remote computing system, and combinations of such.

The stored identification information may also be identification tokens embedded into the mobile application upon creation or derived from the mobile application. An application signature may be constructed based on an arrangement of the embedded and derive identification tokens. The access manager may also provide the mobile application with a nonce during validation, and use the nonce to compute an expected hash value using the application signature and the nonce. The access manager may generate an expected response, e.g., an expected hash value, and compare the expected response to a response received from the mobile application following a challenge from the access manager.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote and local access to computing resources at a remotely located enterprise computing system or at mobile computing devices themselves. An access manager may perform a validation process that determines whether a mobile application requesting access to computing resources has accurately identified itself and has not been subsequently altered after installation at the mobile computing device. In this way, the access manager may ensure the mobile application requesting access to the computing resource can be trusted and is not attempting to circumvent the security mechanisms used to protect those resources. As a result, individuals associated with the enterprise may advantageously utilize computing resources at their personal mobile devices. Computing resources may be located locally or remotely relative to the mobile computing device. Examples of computing resources include a software application operating at the mobile computing device or a remote computing system, a service provided by the mobile computing device or a remote computing system, data stored at the mobile computing device or the remote computing system, hardware at the mobile computing device or the remote computing system, and combinations of such. In the present disclosure, computing resources that are remotely located at a computing system of an enterprise are referred to as enterprise resources.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
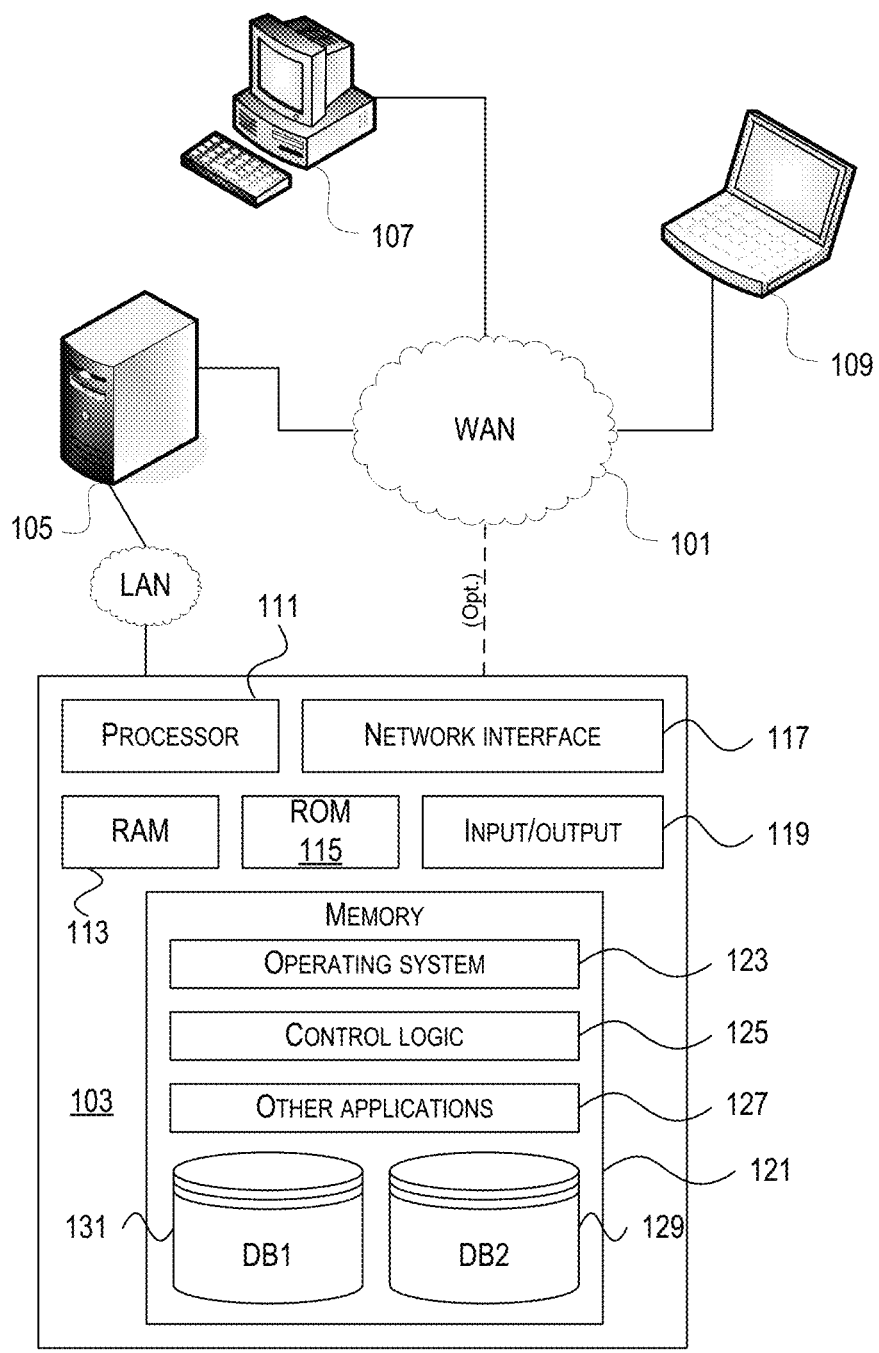
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the disclosure in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosure as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the disclosure as described herein, and other application software 127 providing secondary, support, and/or other functionality which may or may not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionality may be embodied in whole or in part in software, firmware and/or hardware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 2:
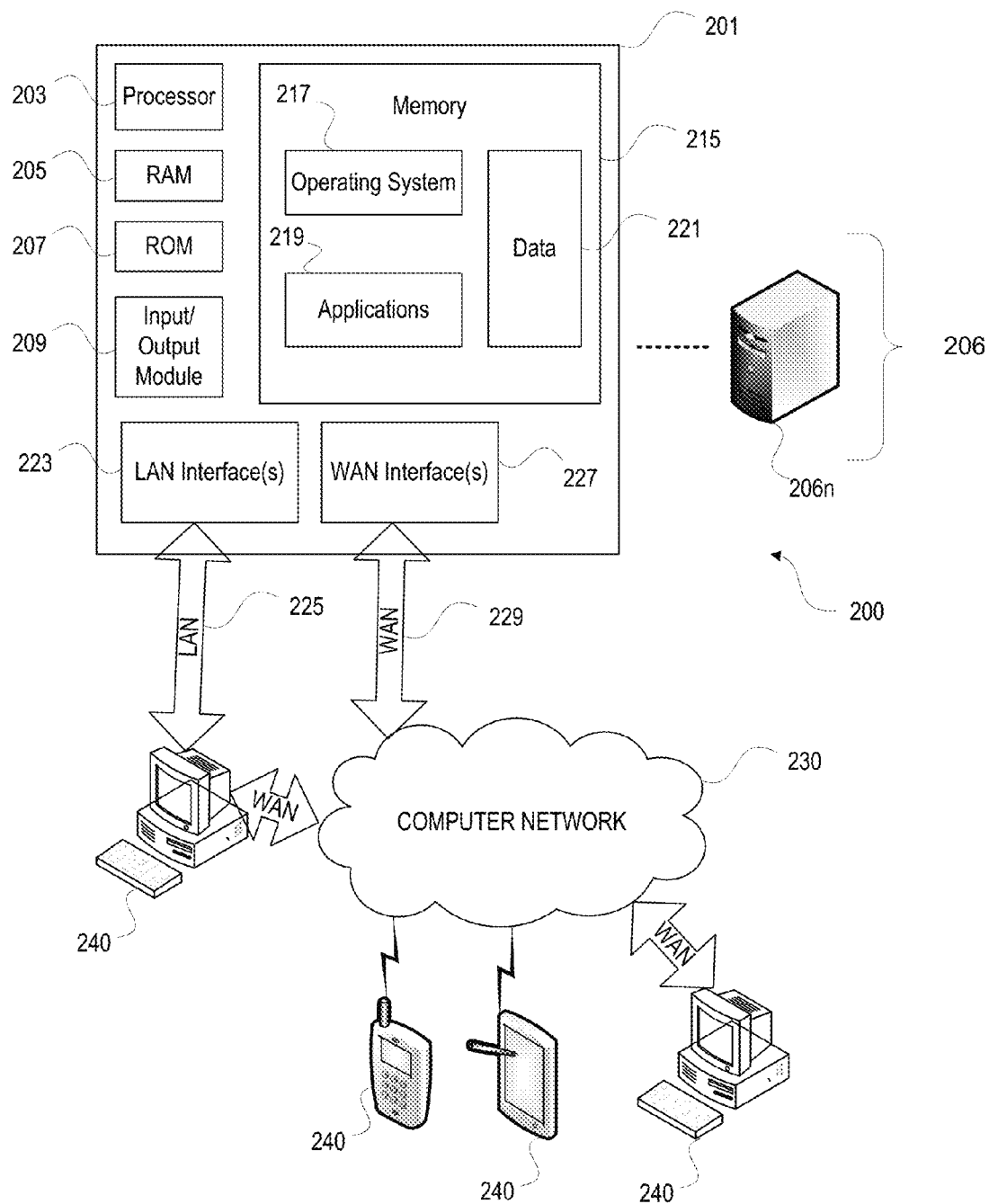
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, an SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 as well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
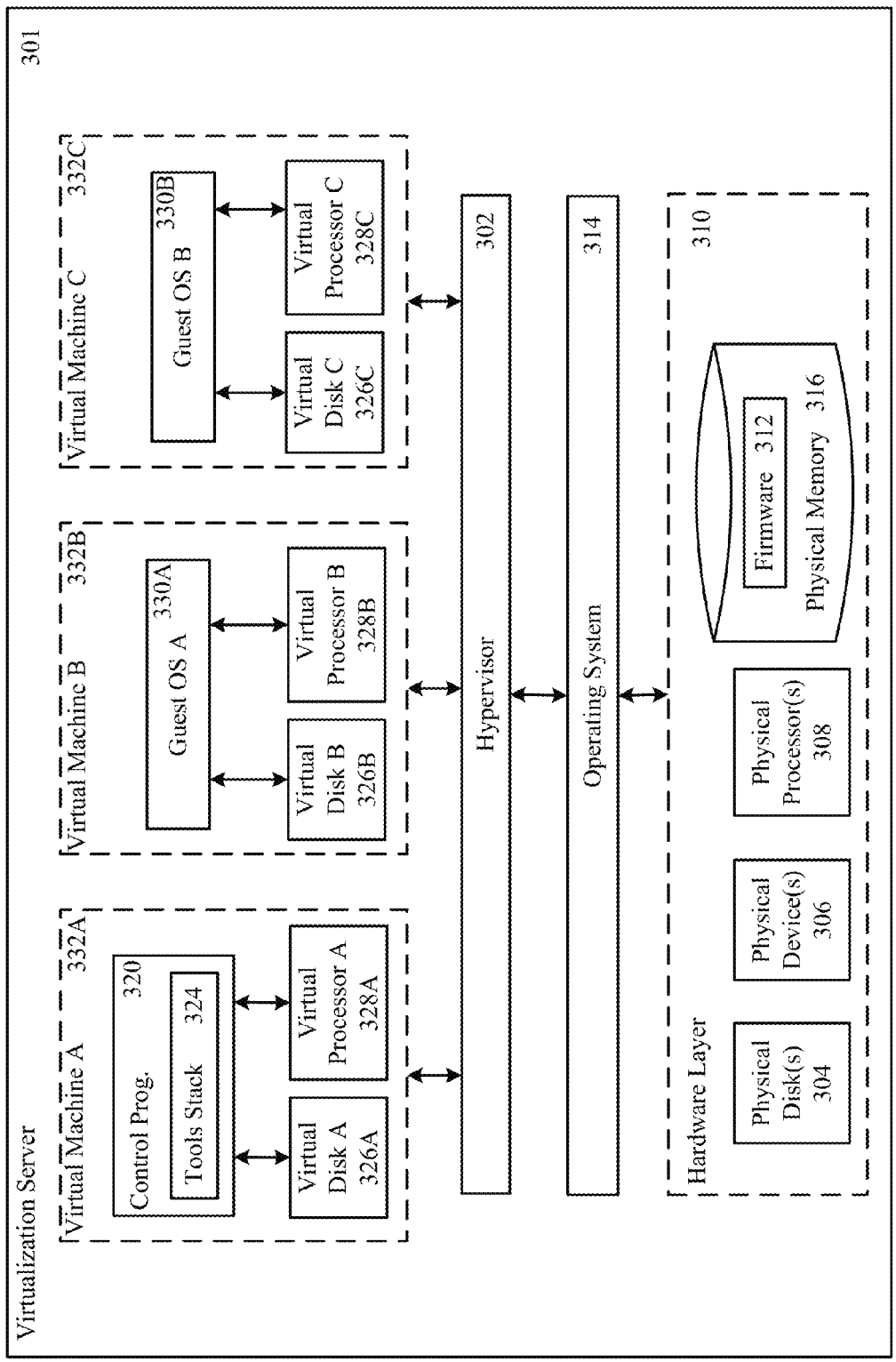
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
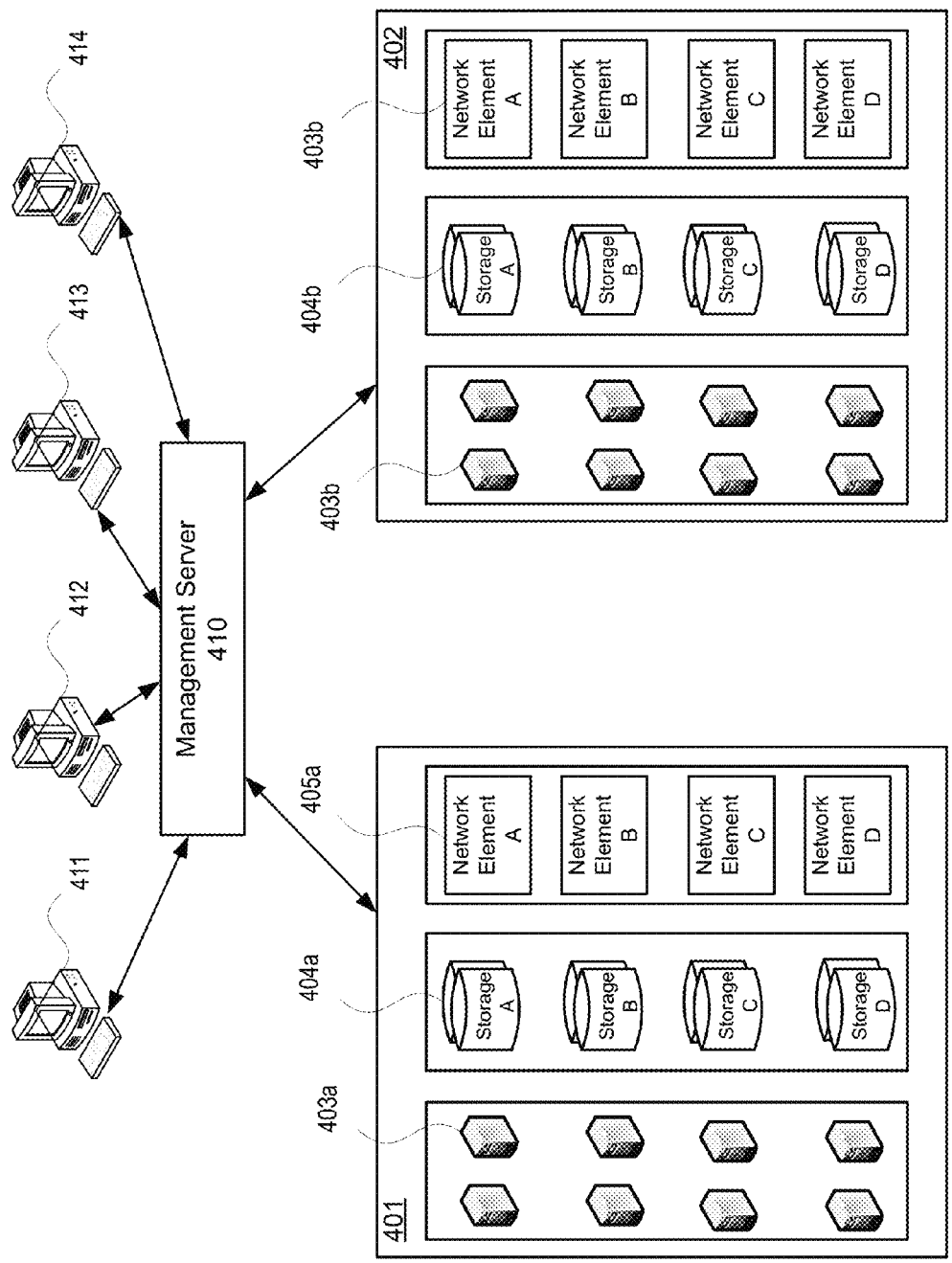
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
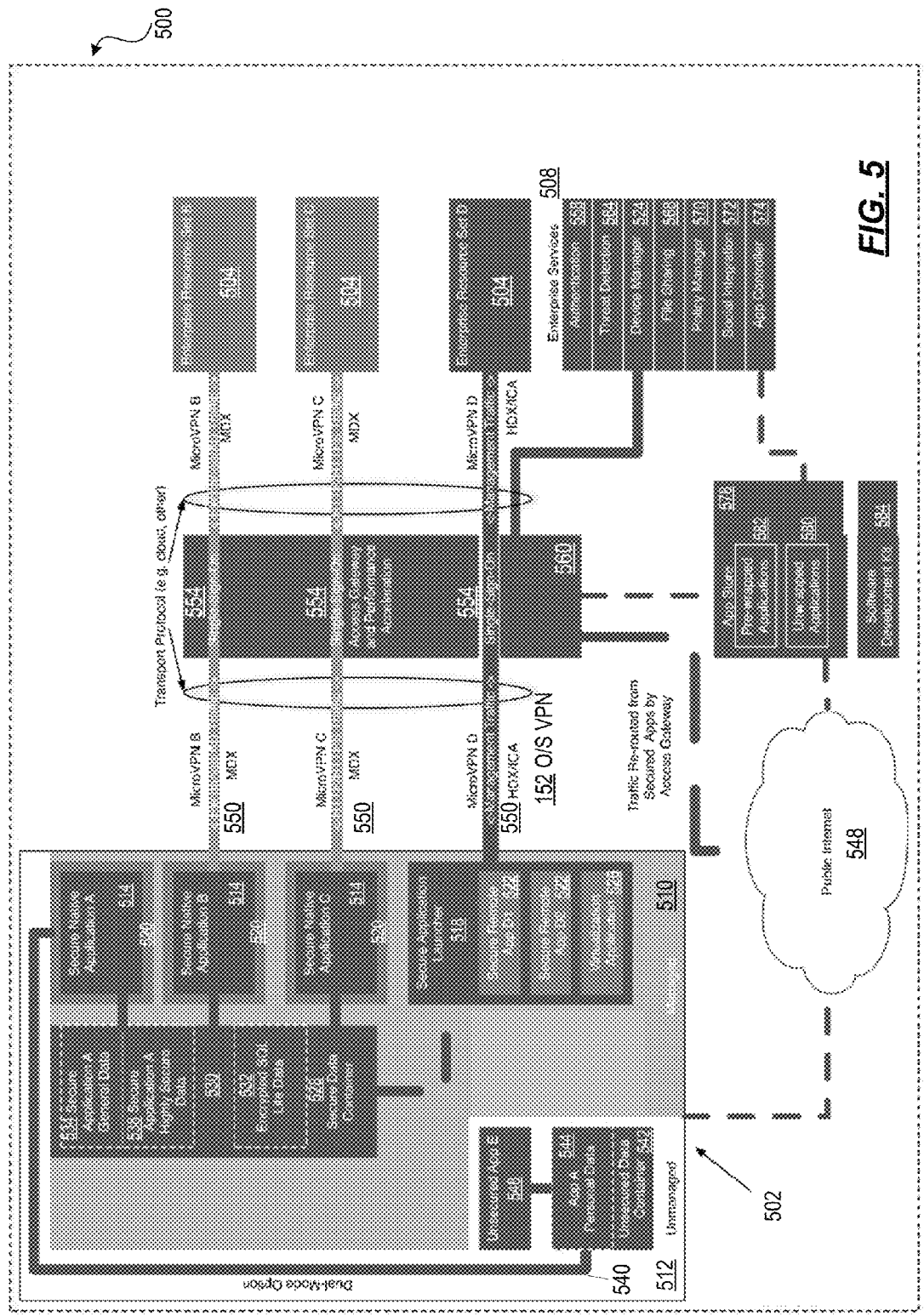
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use.

The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

The operating system of the mobile device may be separated into a managed partition 510 and an unmanaged partition 512. The managed partition 510 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application may use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the examples described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network. The transport network may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network. The transport network may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
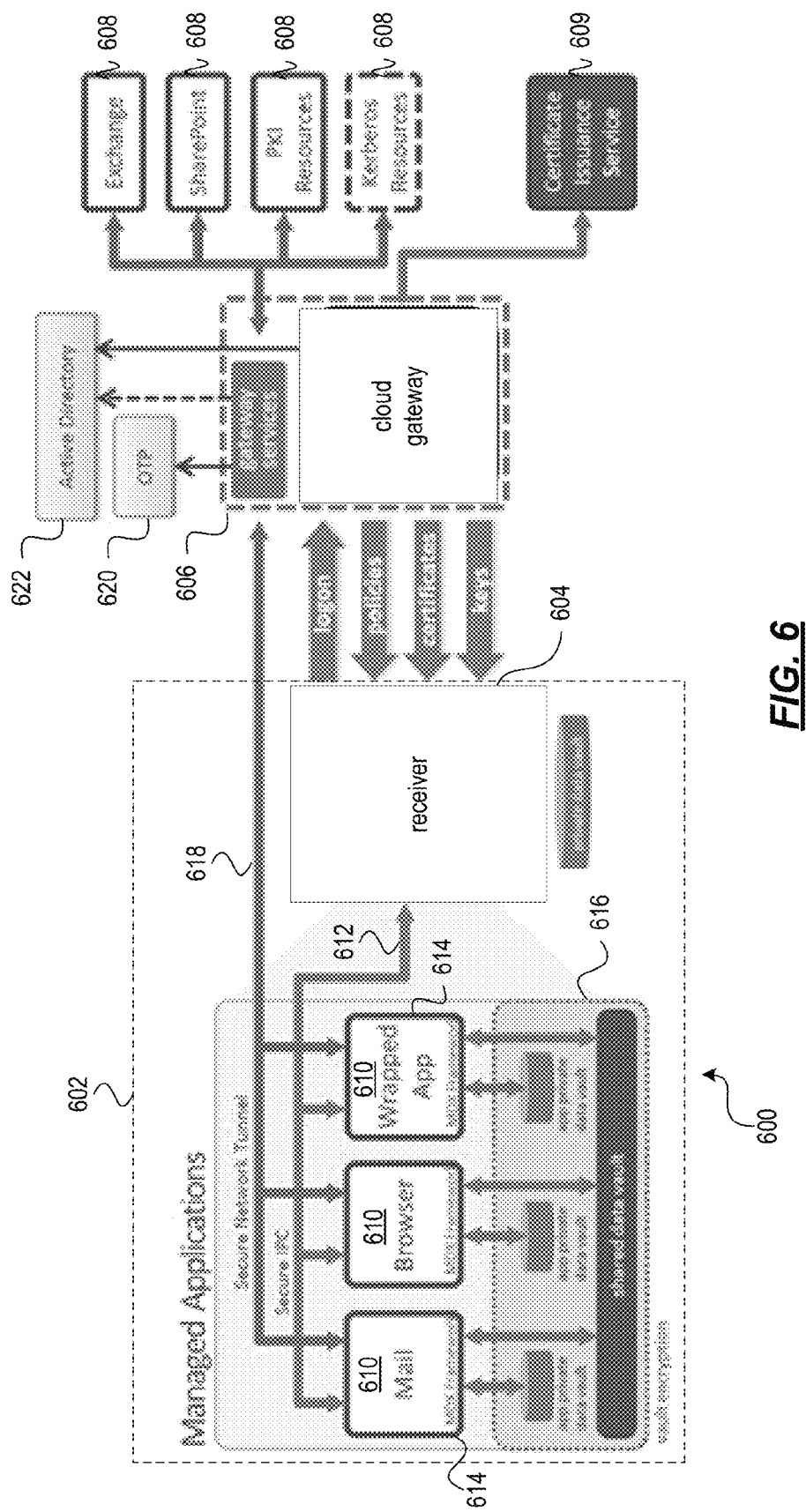
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a receiver 604, which interacts with a gateway 606 to cloud-based services (a "cloud gateway") and to access various enterprise resources 608 and services 609 such as Exchange, Sharepoint, PKI Resources, Kerberos Resources, Certificate Issuance service, as shown on the right hand side above. The cloud gateway 606 may also include access gateway and application controller functionality. Although not specifically shown, the mobile device 602 may also interact with an enterprise application store (a "store front") for the selection and downloading of applications.

The receiver 604 acts as the UI (user interface) intermediary for Windows apps/desktops hosted in an enterprise data center, which are accessed using a display remoting protocol such as, e.g., the HDX/ICA protocol available from Citrix. The receiver 604 also supports the installation and management of native applications on the mobile device 602, such as native iOS or Android applications. For example, the managed applications 610 (mail, browser, wrapped application) shown in the figure above are all native applications that execute locally on the device. The receiver 604 and the mobile application management protocol of this architecture act to provide policy driven management capabilities and features such as connectivity and SSO (single sign on) to enterprise resources/services 608. One example of a mobile application management protocol is the MDX (mobile experience technology) protocol available from Citrix. The receiver 604 handles primary user authentication to the enterprise, normally to an access gateway (AG) with SSO to other cloud gateway components. The receiver 604 obtains policies from the cloud gateway 606 to control the behavior of the managed applications 610 on the mobile device 602.

The secure inter-process communication (IPC) links 612 between the native applications 610 and receiver 604 represent a management channel, which allows the receiver to supply policies to be enforced by the management framework 614 "wrapping" each application. The management framework 614 may be, for example, the MDX framework available from Citrix. The IPC link 612 also allows receiver 604 to supply credential and authentication information that enables connectivity and SSO to enterprise resources 608. Finally the IPC link 612 allows the management framework 614 to invoke user interface functions implemented by receiver 604, such as online and offline authentication.

Communications between the receiver 604 and cloud gateway 606 are essentially an extension of the management channel from the management framework 614 wrapping each native managed application 610. The management framework 614 requests policy information from receiver 604, which in turn requests it from cloud gateway 606. The management framework 614 requests authentication, and receiver 604 logs into the gateway services part of the cloud gateway 606, which may be, e.g., a NetScaler Access Gateway available from Citrix. The receiver 604 may also call supporting services on the cloud gateway 606, which may produce input material to derive encryption keys for the local data vaults 616, or provide client certificates which may enable direct authentication to PKI protected resources, as more fully explained below.

In more detail, the management framework 614 "wraps" each managed application 610. This may be incorporated via an explicit build step, or via a post-build processing step. The management framework 614 may "pair" with receiver 604 on first launch of an application 610 to initialize the secure IPC link 612 and obtain the policy for that application. The management framework 614 may enforce relevant portions of the policy that apply locally, such as the receiver login dependencies and some of the containment policies that restrict how local OS services may be used, or how they may interact with the application 610.

The management framework 614 may use services provided by receiver 604 over the secure IPC link 612 to facilitate authentication and internal network access. Key management for the private and shared data vaults 616 (containers) may be also managed by appropriate interactions between the managed applications 610 and receiver 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through the access gateway functionality of the cloud gateway 606. The management framework 614 is responsible for orchestrating the network access on behalf of each application 610. The receiver 604 may facilitate these network connections by providing suitable time limited secondary credentials obtained following online authentication. Multiple modes of network connection may be used, such as reverse web proxy connections and end-to-end VPN-style tunnels 618.

The mail and browser managed applications 610 have special status and may make use of facilities that might not be generally available to arbitrary wrapped applications. For example, the mail application may use a special background network access mechanism that allows it to access a mail server (e.g., Exchange) over an extended period of time without requiring a full AG logon. The browser application may use multiple private data vaults to segregate different kinds of data.

This architecture supports the incorporation of various other security features. For example, the cloud gateway 606 (including its gateway services) in some cases may not need to validate directory service passwords, e.g., Active Directory (AD) passwords. It can be left to the discretion of an enterprise whether directory service password is used as an authentication factor for some users in some situations. Different authentication methods may be used if a user is online or offline (e.g., connected or not connected to a network).

Step up authentication is a feature wherein the cloud gateway 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (e.g., the cloud gateway), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector may cause multiple copies of the same encrypted data to yield different cipher text output, preventing both replay and cryptanalytic attacks. This may also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of directory service 622 password for access to one or more applications. In some cases, some users do not know (or are not permitted to know) their directory service password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want the store front to be accessed in this manner. In this case, the receiver 604 may require the user to set a custom offline password and the directory service password is not used. Cloud gateway 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the management framework micro VPN feature). For example, an email application may utilize such a certificate. In this case, certificate-based authentication using a mobile data synchronization protocol (e.g., the protocol employed by ActiveSync) may be supported, wherein a certificate from the receiver 604 may be retrieved by the cloud gateway 606 and used in a keychain. Each managed application may have one associated client certificate, identified by a label that is defined in the cloud gateway.

The cloud gateway 606 may interact with an enterprise special purpose web service to support the issuance of client certificates to allow relevant managed applications to authenticate to internal PKI protected resources.

The receiver 604 and the management framework 614 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the management framework to mediate https requests).

Management framework client certificate support on iOS may rely on importing a PKCS 12 BLOB (Binary Large Object) into the iOS keychain in each managed application for each period of use. Management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 602 is authenticated to the enterprise, and vice versa. Virtual smart cards for authentication to cloud gateway 606 may also be implemented.

Both limited and full Kerberos support may be additional features. The full support feature relates to an ability to do full Kerberos login to directory service 622, using a directory service password or trusted client certificate, and obtain Kerberos service tickets to respond to HTTP Negotiate authentication challenges. The limited support feature relates to constrained delegation in AFEE, where AFEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of the store front and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Identification of Managed Mobile Applications

Figure 7:
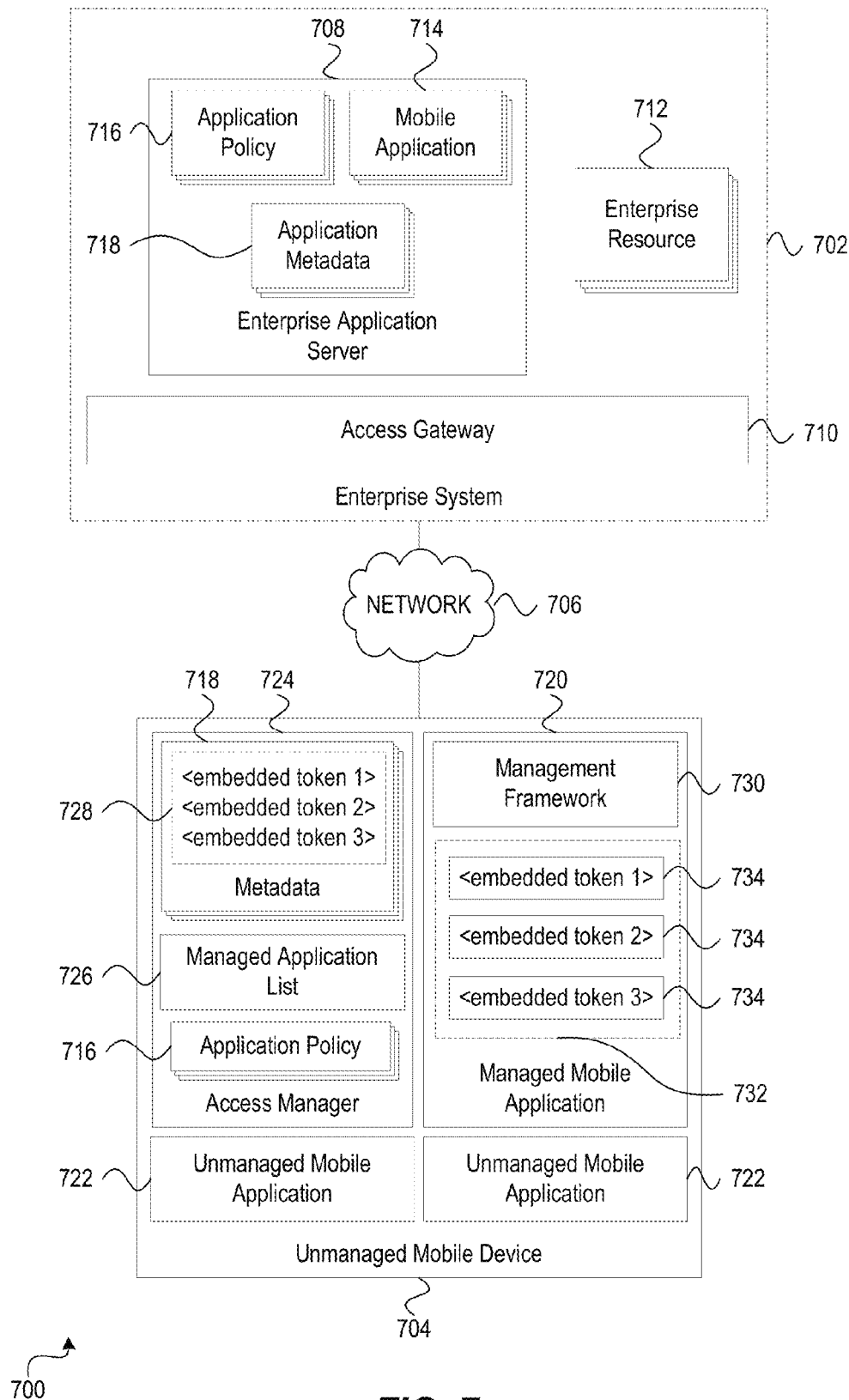
FIG. 7 depicts an illustrative mobile device management system.

In FIG. 7, an illustrative mobile device management system 700 is shown. The system 700 may be similar in many respects to the systems 500 and 600 described above with reference to FIG. 5 and FIG. 6 respectively. The system 700 may also omit certain components described above for the sake of simplicity and may include additional features not mentioned above.

The mobile device management system 700 may include an enterprise system 702 in signal communication with one or more mobile devices 704 via a network 706. The enterprise system may include an enterprise application server 708, an access gateway 710, and one or more computing resources such as enterprise resources 712.

The enterprise application server 708 may be similar in many respects to the application store 578 discussed above with reference to FIG. 5. The enterprise application server 708 may provide access to mobile applications 714 available for installation at a mobile device, e.g., the mobile device 704. As noted above, the mobile applications 714 may include both secured and unsecured mobile applications. Accordingly, the mobile applications 714 may correspond to the unwrapped applications 180 and the pre-wrapped applications 182 described above with reference to FIG. 5. As also noted above, a secured mobile application may be wrapped with a secure application wrapper that enables the management of and control over the execution of the secured mobile application. In this regard, a secured mobile application, wrapped mobile application, or enrolled mobile application may also be referred to as a managed mobile application.

The enterprise application server 708 may also provide access to application policies 716 and application metadata 718 respectively associated with the mobile applications 714. An application policy 716 may represent one of the mechanisms through which management of a mobile application is achieved. As noted above, an application policy 716 may define rights and entitlements with respect to which users may utilize a managed mobile application, which computing resources a managed mobile application may access, the features available at a managed mobile application when executing at a mobile device, and combinations of the same.

Application metadata 718 refers to information that describes and/or identifies a mobile application. Application metadata 718 may be generated during the build process of a new mobile application and made available via the enterprise application server 708 when the new mobile application is published to the enterprise application server Application metadata 718 may include, for example, the name of the mobile application, the size of the mobile application, a unique identifier for the mobile application, the version of the mobile application, and so forth. As discussed further below application metadata 718 may also include information useful to validate the identity of a mobile application.

The access gateway 710 may facilitate access to the enterprise resources 712 from a managed mobile application operating at a mobile device, e.g., the mobile device 704. The access gateway 710 may be similar in many respects to the access gateway 160 and the cloud gateway 606 described above with reference to FIG. 5 and FIG. 6 respectively. The enterprise resources 712 may correspond to the enterprise resources 504 and 608 as well as the enterprise services 508 and 609 as also described above with reference to FIG. 5 and FIG. 6 respectively. Once validated, authenticated, and authorized, mobile applications may access the enterprise resources 712 via the access gateway 710 as described above.

Both managed mobile applications 720 as well as unmanaged mobile applications 722 may reside at the mobile device 704. An access manager application 724 may also reside at the mobile device 704 and manage execution of the managed mobile applications 720 on the mobile device. A mobile device that includes both managed and unmanaged mobile applications may be referred to as an unmanaged mobile device as an enterprise may only be equipped to exercise control over the managed mobile applications at that mobile device and may not be equipped to exercise control over other aspects of the mobile device, e.g., the unmanaged applications. Because the mobile device 704 includes a managed mobile application 720 and unmanaged mobile applications 722, the mobile device shown by way of example in FIG. 7 may be referred to as an unmanaged mobile device and may represent the personal mobile device of an individual.

The access manager application 724 ("access manager") may be similar in many respects to the Receiver 604 discussed above with reference to FIG. 6. As discussed further below, the access manager 724 may manage user authentication, validation of mobile application identity, and enforcement of mobile application policies. A user may access the enterprise application server 708 (e.g., via a web browser) to initially download and install the access manager 724 at the mobile device 704. As noted above, the access manager 724 may also serve as the interface to the enterprise application server 708 enabling a user to browse, download, and install the mobile applications available from the enterprise system 702.

When the user downloads a managed mobile application 720 to the mobile device 704, the access manager 724 may also download the application metadata 718 associated with the managed mobile application 720 as well as any application policies 716 associated with the managed mobile application. As noted above, the access manager 724 may receive the application metadata 718 for a mobile application 720 from the enterprise application server 708. In some example implementations, the access manager 724 may store the application metadata 718 and the application policies 716 at a secure location of the mobile device 704, e.g., the secure data container 528 of FIG. 5 and/or the secure data vaults 616 of FIG. 6.

The access manager 724 may also maintain a list 726 of managed mobile applications currently installed at the mobile device 704 and under management of the access manager. Upon installation of a new managed mobile application, the access manager 724 may add a new entry to the managed mobile application list 726. The new entry in the list 726 may correspond to the new managed mobile application installed at the mobile device 704.

As noted above, the access manager 724 may be configured to validate the identity of the managed mobile application 720, e.g., to ensure that the managed mobile application has accurately identified itself and/or to ensure that the managed mobile application has not been altered after installation at the mobile device 704. The access manager may rely on identification information 728 included in the application metadata 718 to validate the identity of the managed mobile application 720. In some example embodiments, the access manager 724 may rely on the mobile platform on which the managed mobile application 720 is operating in order to validate the identity of the managed mobile application. The operating system of the mobile platform may produce identification information that the access manager 724 may compare to stored identification information for the managed mobile application. If the stored identification information matches the identification information received from the operating system, then the access manager 724 may identify the managed mobile application 720 as a trusted mobile application and grant access to the enterprise resources 712. If the stored identification information for the managed mobile application does not match the identification information received from the operating system, then the access manager 724 may identify the managed mobile application 720 as a suspicious or untrustworthy mobile application and deny access to the enterprise resources 712. As noted above, the access manager 724 may also grant or deny access to local computing resources at the mobile device 704 itself. Local computing resources at the mobile device 704 may include, for example, a camera or other recording hardware; location services such as GPS, network services such as cellular or internet services, communication services such as Bluetooth, interface commands such as the cut-and-paste and screenshot features.

In other example embodiments, the access manager 724 may challenge the managed mobile application 720 to identify itself. The access manager 724 may issue a challenge request to the managed mobile application 720 and determine an expected challenge response. The expected challenge response is a response that is expected to be received from a managed mobile application that has accurately identified itself and that has not been altered. As explained further below, only a mobile application that has accurately identified itself and has not been altered may be able to produce the expected challenged response. If the response received from the managed mobile application 720 matches the expected response, then the access manager 724 may identify the managed mobile application 720 as a trusted mobile application. Having identified the managed mobile application 720 as a trusted mobile application, the access manager may provide the managed mobile application with the credentials necessary to access the enterprise resources 712. If the response received from the managed mobile application 720 does not match the expected response, then the access manager may identify the managed mobile application as a suspicious or untrustworthy mobile application and deny access to the enterprise resources 712. Again, the access manager 724 may grant or deny access to local computing resources at the mobile device 704 depending on whether the response received from the managed mobile application 720 matches the expected response.

The expected response may be based, at least in part, on the identification information 728 included in the application metadata 718 that is associated with the managed mobile application 720. The identification information may be created when the mobile application itself is created. The identification information may be, for example, an original digital certificate or original information that may be used to generate an application signature. The expected response may thus include or otherwise correspond to the identification information 728. As explained further below, a mobile application that submits a false identity or a mobile application that has been subsequently altered is unable to generate the expected response and thus unable to gain access to the computing resources.

Various approaches may be selectively employed to validate the identity of a managed mobile application. The particular approach ultimately implemented may depend on the mobile platform and operating system of the mobile device 704. For example, the Android operating system available from Google Inc. of Mountain View, Calif. may include mechanisms through which the access manager may strongly identify a mobile application requesting access to computing resources. Those skilled in the art will recognize that the Android operating system may include built-in mechanisms for requesting the signing certificate of an application, which the access manager 724 may utilize to validate the identity of a managed mobile application requesting access to the computing resources such as enterprise resources 712. It will also be recognized that the Android operating system may prevent an application from being altered after installation and may prevent a mobile application from using a signing certificate created for a different mobile application. In this way, the access manager 724 may rely on the signing certificates provided by the operating system of the mobile platform in order to validate the identity of a managed mobile application. Validation of application identity using signing certificates will be discussed in further detail below.

Other operating systems, however, may not include built-in mechanisms the access manager 724 may rely on to validate the identity of a managed mobile application requesting access to the computing resources. For example, the iOS operating system available from Apple Inc. of Cupertino, Calif. may not include mechanisms to request a signing certificate for the managed mobile application. In addition, the methods available for inter-process communication in iOS, may not include mechanisms to validate the identity of the mobile applications at each end of the communication. Mobile applications operating on the iOS platform may exchange communications, for example, via a copy-and-paste procedure, via an agreed to URL scheme, or via the network.

In some example implementations, the access manager 724 and the managed mobile application 720 may be configured to communicate via the network, e.g., via the transmission control protocol (TCP). In this example, the access manager 724 may open a TCP socket and wait to receive a connection request from the managed mobile application 720. It will be appreciated, however, that TCP does not include a mechanism to identify the managed mobile application requesting the connection to the access manager 724. Because the iOS platform may not include a mechanism to obtain a signing certificate for the mobile application making the request, additional steps may be employed to validate the identity of the requesting mobile application. Instead of relying on a signing certificate, the access manager 724 in this example, may rely, at least in part, on identification information 732 embedded in and/or derived from the managed mobile application 720 as set forth below.

The wrapping process discussed above may configure a mobile application to operate as a managed mobile application. In this regard, the wrapping process may include (e.g., insert, embed, wrap, etc.) a management framework 730 in the managed mobile application 720. The management framework 730 may correspond to the secure application wrapper 120 and the management framework 614 discussed above with reference to FIG. 5 and FIG. 6 respectively. The management framework 730 enables the access manager 724 to manage the operation of the mobile application 720 as discussed above with reference to FIG. 6.

The managed mobile application 720 may also employ the management framework 730 to identify itself to the access manager 724. In particular, the management framework 730 may generate the response to the challenge posed by the access manager 724 during the identity validation procedure.

In some example implementations, the management framework 730 of the managed mobile application 720 may be configured to generate an application signature. The management framework 730 may also be configured to provide a challenge response that is based, at least in part, on this application signature. The application signature may in turn be based on identification information 732 embedded in and/or derived from the managed mobile application 720. Stated differently, the management framework 730 may generate an application signature based on static information and dynamic information associated with the managed mobile application 720.

The static information may be secret information that is embedded into the managed mobile application 720 during the wrapping process described above. For example, the secret information may include one or more identification tokens 734 embedded into the application during the wrapping process. The identification tokens 734 may be, e.g., randomized alphanumeric strings embedded into the binary of the managed mobile application 720. The management framework 730 may be configured to extract the identification tokens 734 when constructing the application signature in order to respond to the challenge received from the access manager 724.

The dynamic information may be identification tokens derived from the managed mobile application 720. For example, the derived identification tokens may be hash values obtained using selective hash functions on the various components of the mobile application bundle, e.g., the mobile application binary, application icon, application frameworks, and the like. The access manager 724 may derive this dynamic identification information in an ad hoc fashion during the identity validation procedure. One or more selective hash functions may be used to generate one or more selective hash values that represent the derived identification tokens. The access manager may utilize the management framework 730 to help derive the dynamic identification information from the managed mobile application 720 as needed.

The management framework 730 may also be configured to construct the application signature used in the response to the challenge received from the access manager 724. The application signature may comprise a combination of the static information extracted from the managed mobile application 720 as well as the dynamic information derived from the managed mobile application. The management framework 730 may further be configured to arrange the static information and the dynamic information within the application signature in a particular way. Thus, strong identification of the managed mobile application 720 may be achieved through the static information embedded in the managed mobile application, the dynamic information derived from the mobile application, and the arrangement of the static and dynamic information within the application signature.

As noted above, the access manager 724 may be configured to generate an expected response when challenging the managed mobile application 720. Accordingly, the access manager 724 may likewise be configured to construct an expected application signature. The access manager 724 may construct the expected application signature based on the identification information 728 included in the application metadata 718 for the managed mobile application 720. The access manager may also be configured to dynamically derive the dynamic information from the managed mobile application 720. Furthermore, the access manager 724 may likewise be configured to arrange the static and dynamic information within the expected application signature in a particular way.

In order to guard against replay attacks, the access manager 724 may provide a nonce (e.g., an arbitrary and random number) to the managed mobile application 720 for use in the response to the challenge. The access manager 724 may hash the nonce with the expected application signature to obtain an expected hash value. Similarly, the management framework 730 of the managed mobile application may hash the application signature with the received nonce to obtain a response hash value. In response to the challenge from the access manager 724, the managed mobile application 720 may thus provide the access manager with the computed hash value obtained from the application signature and the nonce received from the access manager. The access manager may thus compare the expected hash value to the received hash value. The access manager 724 may thus identify the managed mobile application 720 as a trusted mobile application when the expected hash value matches the received hash value.

Figure 8:
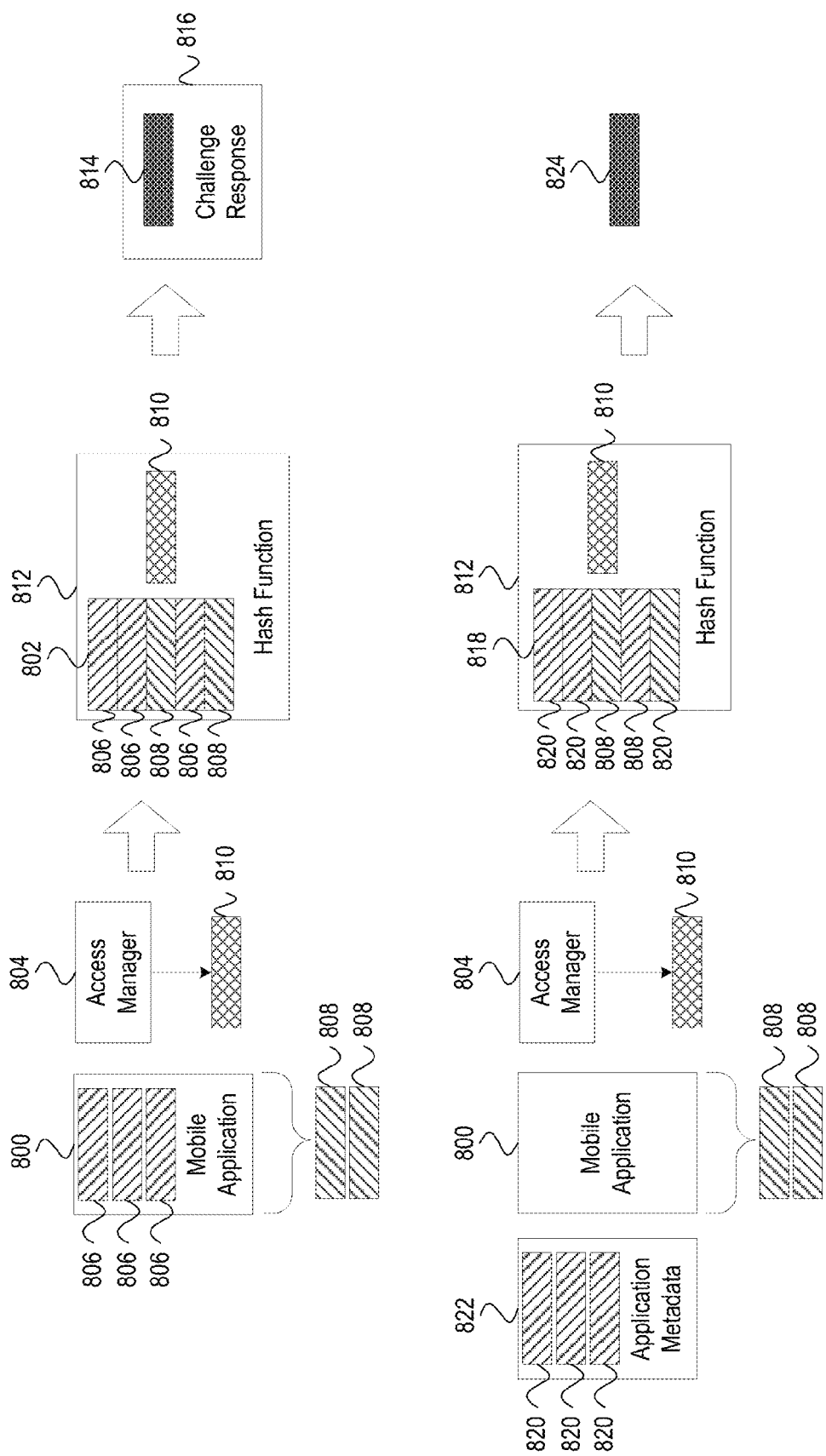
FIG. 8 depicts a block diagram of an illustrative application signature and challenge response for a managed mobile application.

With reference to FIG. 8 a block diagram of an illustrative application signature and challenge response is shown. As noted above, a managed mobile application 800 may generate an application signature 802 in response to a challenge from an access manager 804. The application signature 802 may include identification tokens 806 embedded in the managed mobile application 800 as well as identification tokens 808 derived from the managed mobile application. As seen in FIG. 8, the managed mobile application 800 may arrange the embedded identification tokens 806 and the derived identification tokens 808 in a particular way within the application signature 802. As an example, the managed mobile application 800 may concatenate the embedded identification tokens 806 and the derived identification tokens 808 in a particular order to construct the application signature. In another example, the managed mobile application 800 may concatenate portions of the embedded identification tokens 806 and portions of the derived identification tokens 808 to construct the application signature. It will be appreciated that various approaches to constructing the application signature may be selectively employed. As also noted above, the access manager 804 may provide a nonce 810 to the managed mobile application 800. The managed mobile application 800 may employ a hash function 812 to generate a hash value 814 based on the application signature 802 and the nonce 810. The managed mobile application 800 may provide the hash value 814 to the access manager 802 in the response 816 to the challenge received.

To validate the identity of the managed mobile application 800, the access manager 804 may construct an expected application signature 818 based on the identification tokens 820 stored with the application metadata 822 and identification tokens 808 derived from the managed mobile application. The access manager 804 may also employ the hash function 812 to generate an expected hash value 824 based on the identification tokens 820 from the application metadata 822 and the nonce 810. In response to the challenge, the access manager 804 may receive the challenge response 816 and compare the hash value 814 in the challenge response with the expected hash value 824.

With the benefit of the present disclosure, it will be appreciated that only an unaltered mobile application received from the enterprise application server (708 in FIG. 7) may generate the expected hash value 824. It will also be appreciated that the expected application signature 818 may not be stored persistently at the mobile device, but rather reconstructed as needed to verify the identity of the mobile application 800 requesting access to computing resources. The approach set forth above thus represents a mechanism to strongly identify a mobile application in order to determine whether to grant or deny the mobile application access to computing resources.

FIGS. 9-14 depict example methods steps related to aspects of validating the identity of a managed mobile application, enforcing application policies once validated, and controlling operation of the managed mobile applications.

Figure 9:
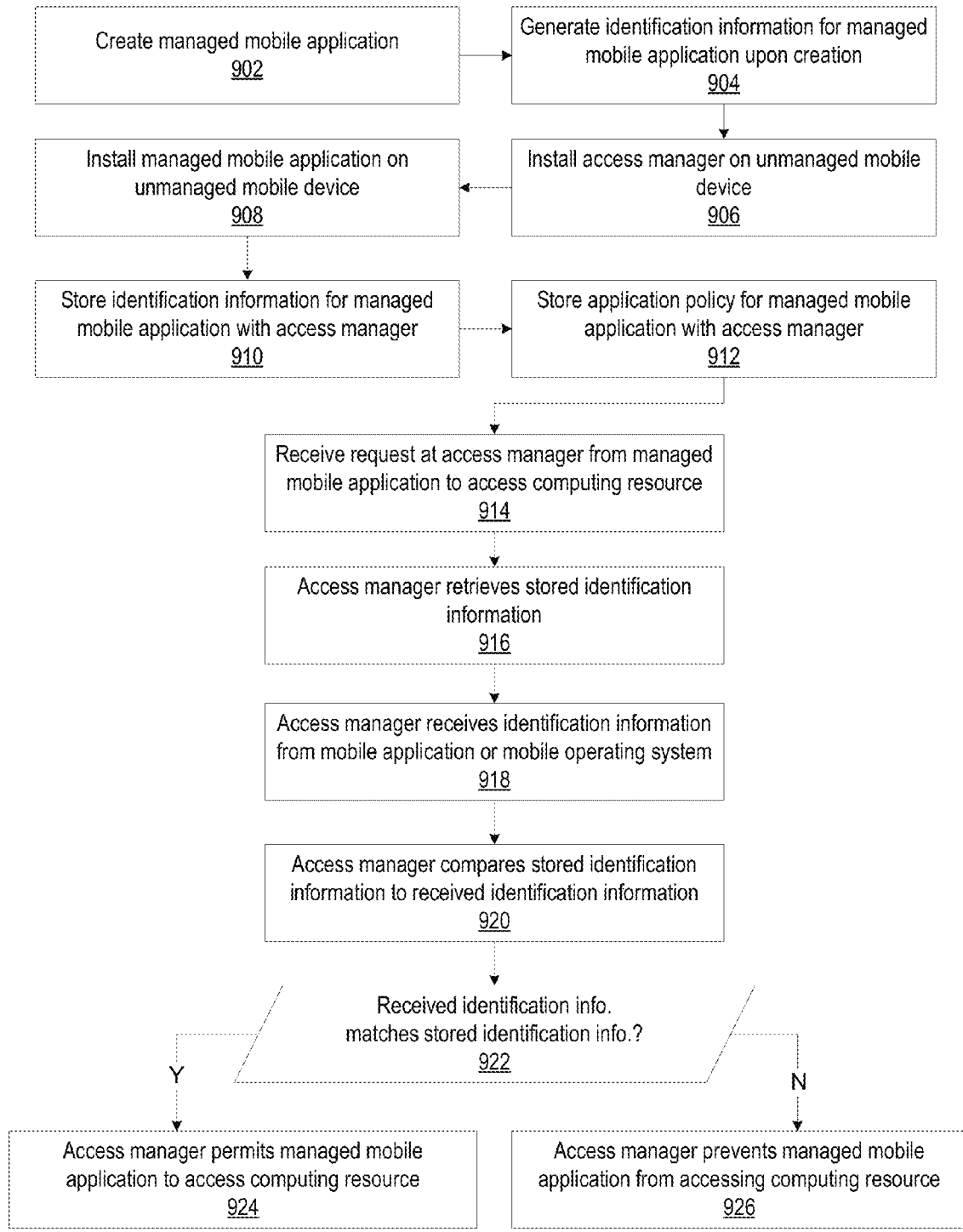
FIG. 9 is a flowchart of example method steps for managing a mobile application at an unmanaged mobile device.

In FIG. 9, a flowchart 900 of example method steps for managing a mobile application at an unmanaged mobile device is shown. An enterprise may create a managed mobile application configured to operate at a mobile device (e.g., an unmanaged mobile device) and configured to access computing resources from the mobile device (block 902). The enterprise may also configure the managed mobile application to be managed by an access manager application at the mobile device. As noted above, the enterprise may wrap or otherwise include a management framework (e.g., the MDX framework) that enables the access manager to validate the identity of the managed mobile application and control operation of the managed mobile application.

Upon creation of the managed mobile application, the enterprise may also create identification information associated with the managed mobile application (block 904). The identification information may be, for example, a signed application certificate and/or application metadata that includes identification tokens. The identification tokens may be embedded into the managed mobile application (e.g., into the application binary) in some example implementations. A user may download and install the access manager at a mobile device (block 906). The access manager may provide the user with an interface from which to browse the enterprise application server (e.g., the enterprise application store) and select various managed mobile applications to download to the mobile device. The access manager may require the user to provide access credentials in order to logon to the enterprise application server. The user may be associated with a user profile, and the user profile may be associated with various rights and entitlements. In this way, the managed mobile applications presented to the user as available to download depend upon the rights and entitlements assigned to the user, e.g., the enterprise application server may only present managed mobile applications that the user is entitled to use.

Having selected a managed mobile application, the user may download the mobile application via the access managed and install the mobile application at the mobile device (block 908). The enterprise application server may also provide the identification information associated with the mobile application as well as an access policy associated with the mobile application. Accordingly, when the user downloads and installs a managed mobile application, the access manager may also download and store the identification information (block 910) and the application policy (block 912) associated with the mobile application.

Having installed the mobile application at the mobile device, the user may utilize the mobile application to access a computing resource. When the mobile application seeks to access the computing resource, the mobile application may check-in with the access manager and request access to the resource (block 914). Upon receipt of the request to access the computing resource, the access manager may retrieve the identification information received from the enterprise application server and stored at the mobile device (block 916). The access manager may also receive identification information from the mobile operating system, e.g., a signed application certification, or from the mobile application itself, e.g., a hash value based, at least in part, on an application signature (block 918).

The access manager may then compare the stored identification information to the received identification information (block 920). If the received identification information matches the stored identification information (block 922:Y), then the access manager may determine that the mobile application is valid and identify the mobile application as a trusted mobile application. Accordingly, the access manager may permit the managed mobile application to access the computing resource (block 924). The access manager may, for example, provide the mobile application with the access credentials, certificates, keys, and the like necessary to establish a connection with and access an enterprise resource. In some example implementations, the application policy associated with the mobile application may determine the manner in which the mobile application accesses and uses the computing resource. If the received identification information does not match the stored identification information (block 924:N), then the access manager may determine that the mobile application is invalid and not identify the mobile application as a trust mobile application and thus prevent the mobile application from accessing the computing resource (block 926).

Figure 10:
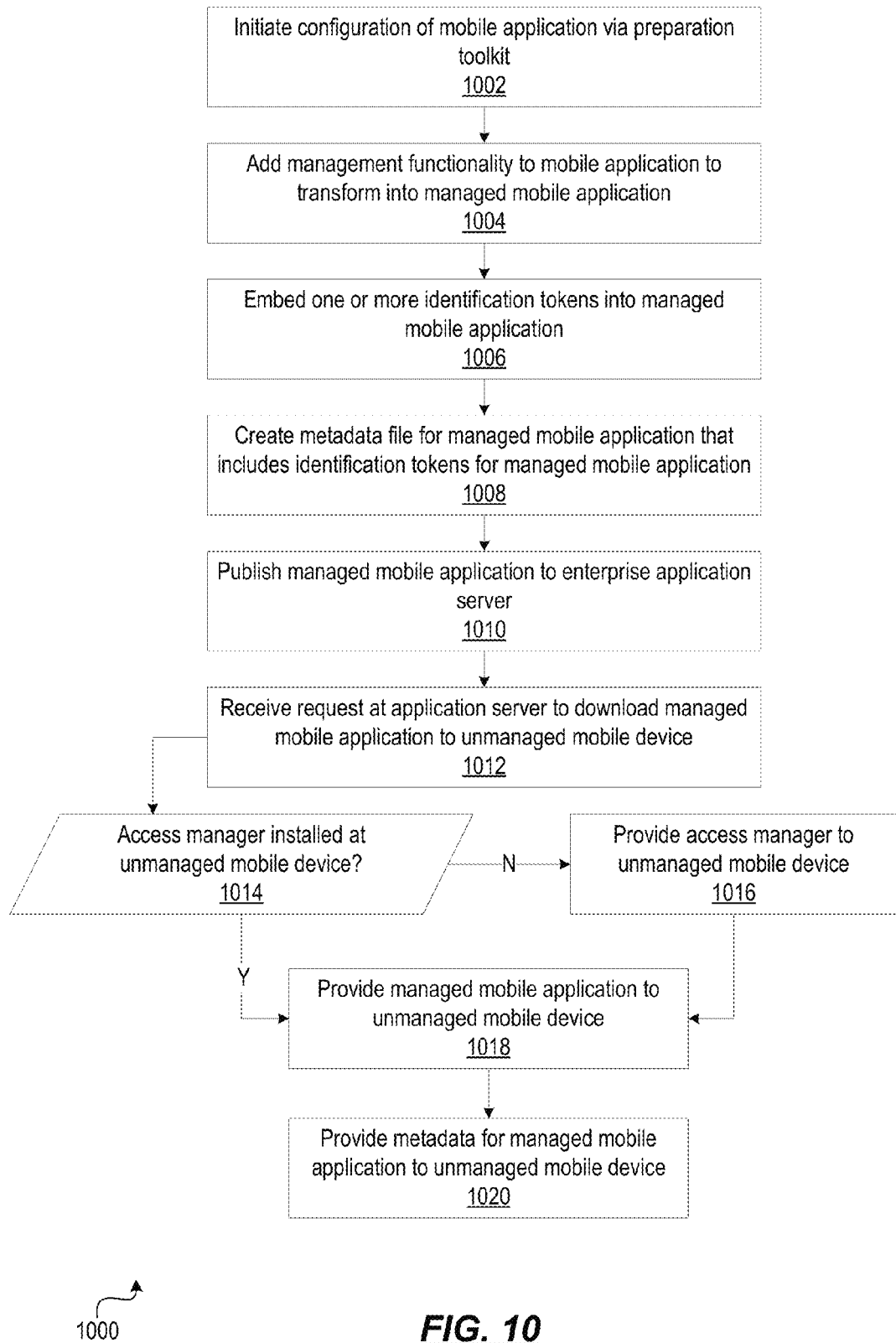
FIG. 10 is a flowchart of example method steps for preparing a managed mobile application for managed operation at an unmanaged mobile device.

In FIG. 10 is a flowchart 1000 of example method steps for preparing a managed mobile application for managed operation at an unmanaged mobile device. As noted above, some mobile operating systems may not provide built-in mechanisms the access manager may employ to validate the identity of the mobile application. Accordingly, the mobile application may be configured such that it can strongly identify itself. The enterprise may use a toolkit to prepare a mobile application as a managed mobile application (block 1002). The toolkit may add functionality (e.g., the MDX framework) that transforms the mobile application into a managed mobile application (block 1004). The toolkit may also generate and embed identification tokens (e.g., randomized strings) into the managed mobile application (block 1006). The functionality added to the managed mobile application may include functionality that enables the managed mobile application to extract, arrange, and combine the embedded identification tokens in order to construct an application signature. The functionality added to the managed mobile application may also include functionality that enables the managed mobile application to derive identification tokens dynamically as well as to arrange and combine the derived identification tokens with the embedded identification tokens when constructing the application signature. Furthermore, the functionality added to the managed mobile application may additionally include functionality that enables the managed mobile application to generate a hash value based, at least in part, on the application signature.

The toolkit may also generate application metadata for the managed mobile application that includes the identification tokens embedded into the mobile application (block 1008). The enterprise may then publish the managed mobile application to the enterprise application server along with the application metadata and any application policies associated with the mobile application (block 1010). The enterprise application server may receive a request from a mobile device to download a selected mobile application (block 1012). If the access manager has not yet been installed at the mobile device (block 1014:N), then the enterprise application server may first download the access manager application to the mobile device (block 1016). Once the access manager is installed at the mobile application (block 1014:Y), the enterprise application server may download the selected mobile application to the mobile device in response to receipt of the request (1018). As noted above, the enterprise application server may also download to the mobile device the application metadata associated with the selected mobile application for storage at the mobile device. The access manager may have access to the application metadata thereby enabling the access manager to validate the identity of the mobile application associated with the application metadata.

Figure 11:
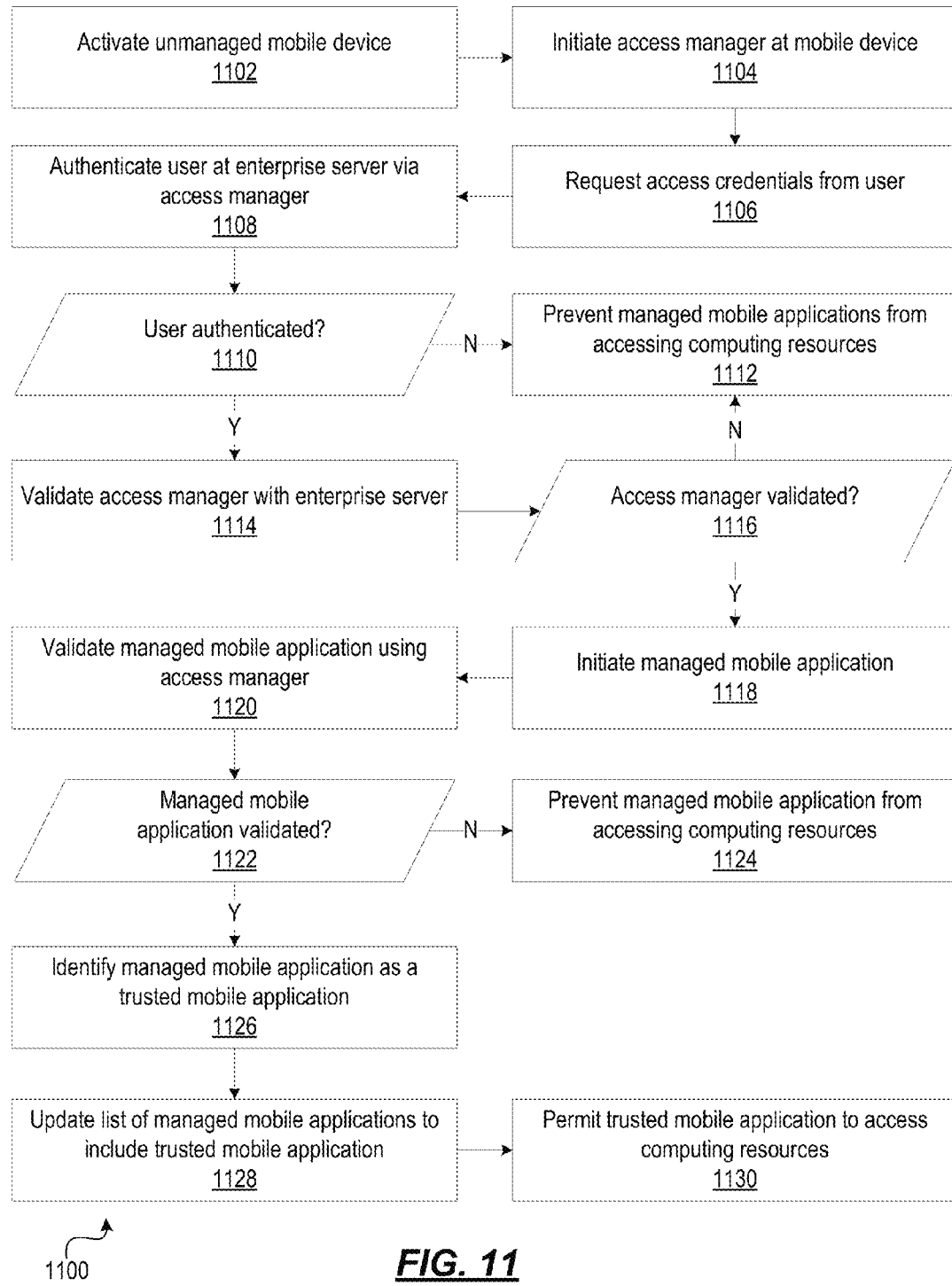
FIG. 11 is a flowchart of example method steps for initializing a managed mobile application at an unmanaged mobile device.

In FIG. 11, a flowchart 1100 of example method steps for initializing a managed mobile application at an unmanaged mobile device is shown. When the mobile device is first activated and initialized (block 1102), the access manager application may be one of the first mobile applications launched (block 1104). The access manager may, for example, launch automatically as part of the startup process of the mobile device and/or in response to user input received at the mobile device. When the access manager application launches, the access manager may request access credentials (e.g., a username and password) from the user (block 1106). The access manager may then provide the access credentials to the enterprise server for authentication (block 1108). If the enterprise server does not authenticate the user (block 1110:N), then the access manager may prevent any managed mobile applications at the mobile device from accessing the computing resources (block 1112). For example, the access manager may refrain from providing mobile applications the access credentials necessary to establish connections with the enterprise resources.

If the enterprise server does authenticate the user (block 1110:Y), then the enterprise server may validate the identity of the access manager itself (block 1114) in order to ensure that the access manager application has not been altered. The enterprise server may validate the identity of the access manager in the same manner as the managed mobile application. As an example, a signing certificate used to sign the access manager may be employed to validate the access manager application. For example, the enterprise system may validate the managed mobile application. If the access manager is not validated (block 1116:N), then the management framework of the managed mobile applications may treat the access manager as missing from the mobile device, and the managed mobile applications may thus be prevented from accessing the computing resources (block 1112).

If the enterprise server does validate the identity of the access manager application (block 1116:Y), then a managed mobile application may be initiated (block 1118). Upon launch as well as during operation, the mobile application may check-in with the access manager so that the access manager may validate the identity of the managed mobile application (block 1120). If the access manager cannot validate the identity of the managed mobile application (block 1122:N), then the access manager may prevent the managed mobile application from accessing the computing resources (block 1124). If the access manager successfully validates the identity of the managed mobile application (block 1122:Y), then the access manager may identify the managed mobile application as a trusted mobile application (block 1126). If the managed mobile application has just launched at the mobile device, then the access manager may update the list of mobile applications managed by the access manager to include the trusted mobile application (block 1128). Having validated the identity of the managed mobile application, the access manager may also permit the trusted mobile application to access the computing resources (block 1130).

Figure 12:
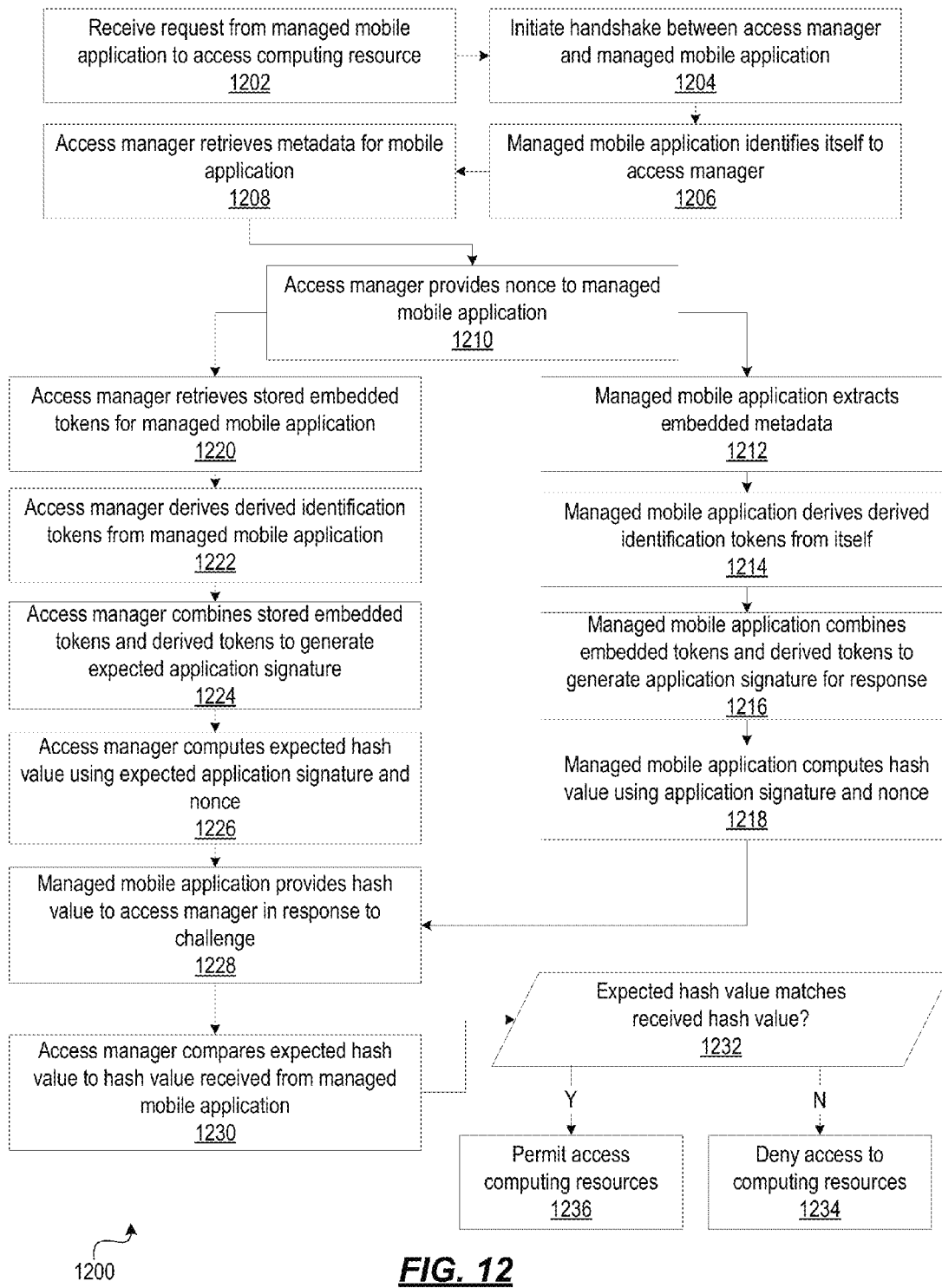
FIG. 12 is a flowchart of example method steps for validating a managed mobile application at an unmanaged mobile device having a first type of mobile operating system.

In FIG. 12, is a flowchart 1200 of example method steps for validating a managed mobile application at an unmanaged mobile device having a first type of mobile operating system is shown. The mobile operating system, in this example, may not include built-in mechanisms the access manager may utilize to validate the identity of a mobile application. The access manager may receive a request from a managed mobile application seeking to access a computing resource (block 1202). Upon receipt of the request, the access manager may initiate a handshake with the managed mobile application to start the identity validation process (block 1204). The managed mobile application may identify itself to the access manager, e.g., by providing a unique application identifier to the access manager (block 1206). In turn, the access manager may utilize the application identifier to retrieve the application metadata associated with the mobile application (block 1208). The access manager may also generate a nonce and provide the nonce to the mobile application (block 1210).

The access manager and the managed mobile application may then begin the process of constructing the application signature and corresponding hash value used to validate the identity of the mobile application and determine whether the mobile application is a trusted mobile application. The mobile application may extract the embedded identification tokens (block 1212) and derive the derived identification tokens (block 1214) used to construct the application signature. The mobile application may then arrange and combine the embedded identification tokens extracted and the derived identification tokens to obtain the application signature (block 1216). The mobile application may then compute a hash value using the application signature and the nonce received from the access manager (block 1218).

Having provided the nonce to the mobile application, the access manager may retrieve the embedded identification tokens from the application metadata associated with the mobile application (block 1220). The access manager may similarly derive the derived identification tokens from the mobile application (block 1222) used to construct the expected application signature. The access manager may then arrange and combine the embedded identification tokens retrieved from the application metadata and the derived identification tokens to obtain the expected application signature (block 1224). The access manager may then compute an expected hash value using the expected application signature and the nonce provided to the mobile application (block 1226).

It will be appreciated that the hash value computed by the access manager should be the same as the hash value computed by the mobile application if the embedded identification tokens retrieved from the application metadata are the same as the embedded identification tokens extracted from the mobile application; if the identification tokens derived by the access manager are the same as the identification tokens derived by the mobile; if the expected application signature constructed by the access manager is the same as the application signature constructed by the mobile application; and if the mobile application uses the nonce provided by the access manager to compute the hash value. Accordingly, the mobile application may provide the hash value in a response to the access manager (block 1228), and the access manager may compare the expected hash value to the value received from the mobile application (block 1230). If the expected hash value does not match the received hash value (block 1232:N), then the access manager may determine that the mobile application has falsely identified itself, has been altered after installation at the mobile device, and so forth. As a result, the access manager may deny the mobile application access to the computing resources (block 1234). If the expected hash value matches the received hash value (block 1232:Y), then the access manager may identify the mobile application as a trusted mobile application and permit the trusted mobile application to access the computing resources (block 1236).

Figure 13:
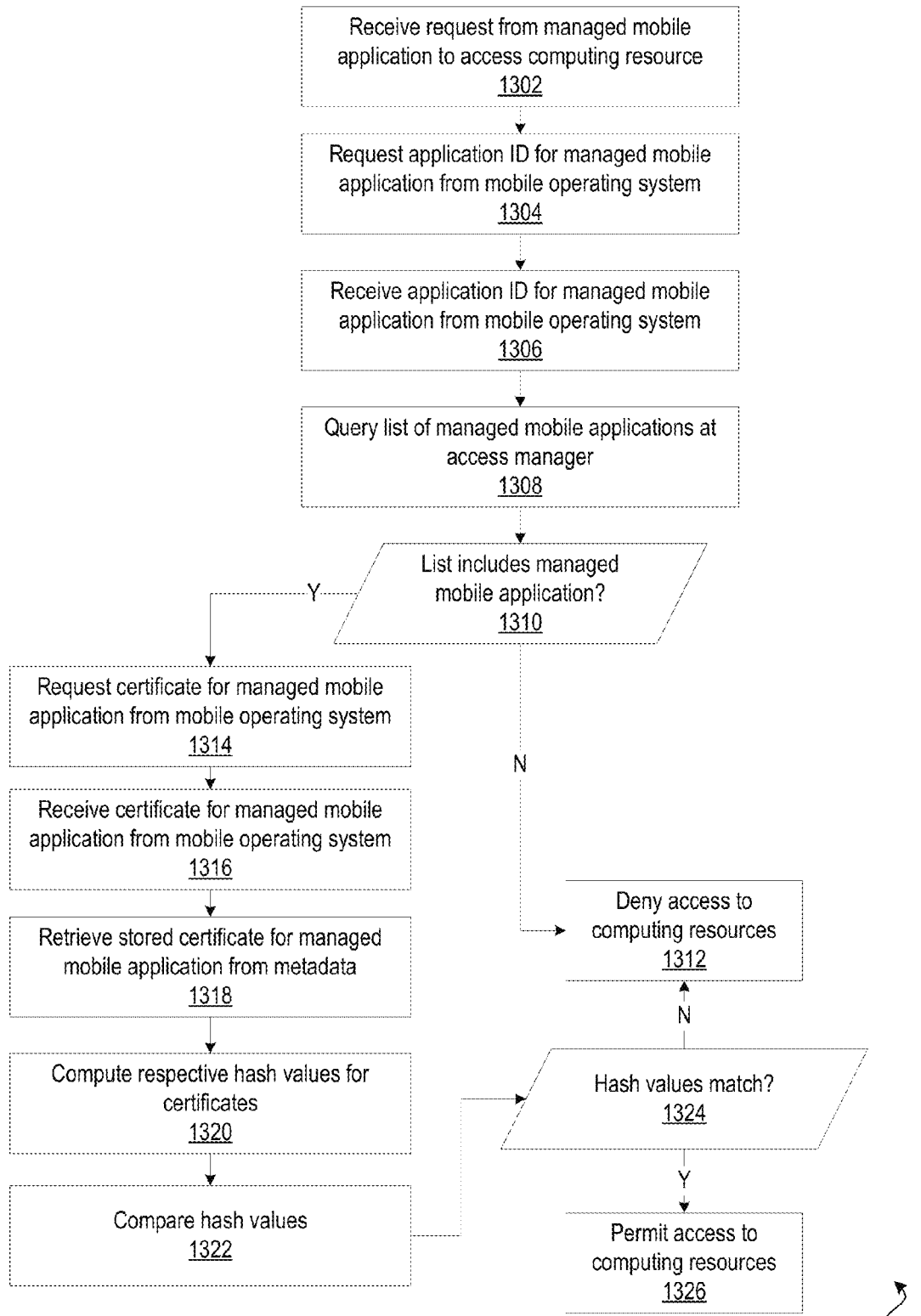
FIG. 13 is a flowchart of example method steps for validating a managed mobile application at an unmanaged mobile device having a second type of mobile operating system.

In FIG. 13, a flowchart 1300 of example method steps for validating a managed mobile application at an unmanaged mobile device having a second type of mobile operating system is shown. The mobile operating system, in this example, may include built-in mechanisms the access manager may utilize to validate the identity of a mobile application. The access manager may receive a request from the managed mobile application to access a computing resource (block 1302). The access manager may request from the mobile operating system a unique application identifier for the mobile application (block 1304) and receive the application identifier in response (block 1306).

Based on the application identifier for the mobile application, the access manager may query the list of managed mobile applications (1308). If the list of managed mobile applications does not include the mobile application requesting access to the computing resource (block 1310:N), then the access manager may deny the mobile application access to the resource (block 1312). If, however, the list of managed mobile applications does include the mobile application requesting access to the computing resource (block 1310:Y), the access manager may then request from the mobile operating system the application certificate for mobile application (block 1314).

As noted above, the enterprise application server may provide application certificates for the mobile applications installed at mobile devices. The application certificates may be stored at a secure storage location at the mobile device that is accessible by the access manager. Accordingly, the access manager may receive the requested application certificate from the mobile operating system (block 1316) and retrieve the stored application certificate provided by the enterprise application server (block 1318). In some example implementations, the access manager may compute respective hash values for each of the certificates (step 1320), e.g., using the SHA-1 hash function. The access manager may compare the hash value of the stored certificate to the hash value of the certificate received from the mobile operating system. (block 1322). If the hash values match (block 1324:Y), then the access manager may determine that the mobile application is a trusted mobile application and permit the mobile application to access the computing resources (block 1326). If the hash values do not match (block 1324:N), then the access manager may determine that the mobile application is an untrusted mobile application and deny the mobile application access to the computing resources (block 1312).

Figure 14:
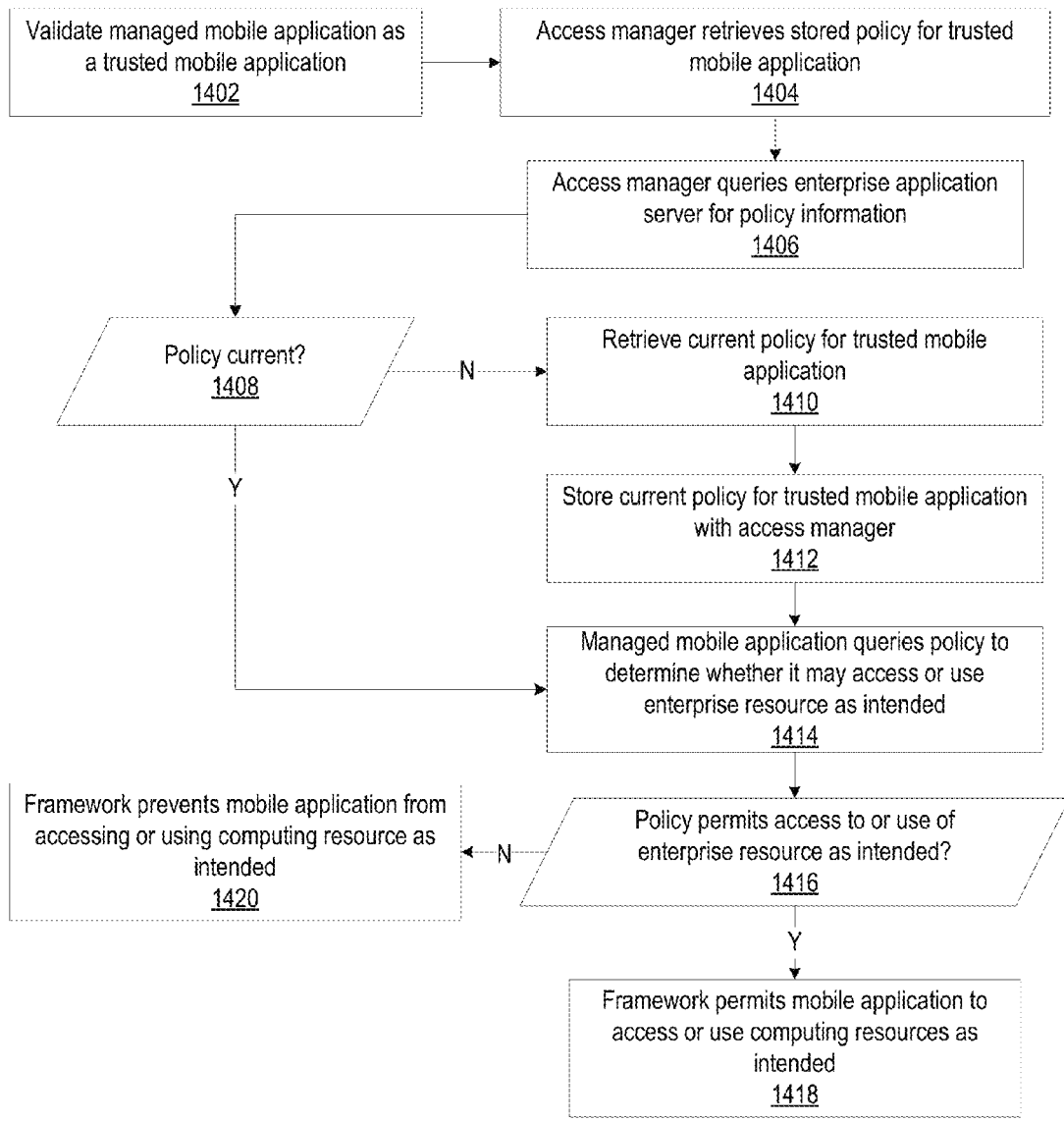
FIG. 14 is a flowchart of example method steps for enforcing application policies during operation of a managed mobile application.

In FIG. 14. a flowchart 1400 of example method steps for enforcing application policies during operation of a managed mobile application is shown. As noted above, the enterprise application server may provide application policies associated with the managed mobile applications installed at mobile devices. An enterprise may periodically update the application policies, and the access manager may thus be configured to ensure the most recent and up-to-date application policies are stored at a mobile device before permitting a managed mobile application from accessing the computing resources. In this way, the enterprise may grant or revoke entitlements to applications and application functionalities.

After the access manager validates the identity of a managed mobile application (block 1402), the access manager may retrieve the application policy associated with the managed mobile application and stored at the mobile device (block 1404). The access manager may then query the enterprise application server for policy information associated with the application policy (block 1406), e.g., a policy date, a policy version number, and the like. Based on the policy information received from the enterprise application server, the access manager may determine whether the application policy stored at the mobile device is current (block 1408). As an example, the access manager may compare the policy date or policy version received from the enterprise application server to the policy date or policy version of the application policy stored at the mobile device. If the policy date or policy version do not match, then the access manager may determine that the application policy stored at the mobile device is not current (block 1408:N). If the policy date or policy version do match, then the access manager may determine that the application policy stored at the mobile device is current (block 1408:Y).

If the application policy is not current (block 1408:N), then the access manager may retrieve the current policy associated with the mobile application from the enterprise system, e.g., the enterprise application store (block 1410). The access manager may download the current application policy and store the current application policy at a secure storage location at the mobile device (block 1412). Once the access manager has obtained the current policy for the mobile application, the managed mobile application may refer to the application policy to determine whether it may access or use the computing resource as intended (block 1414).

The management framework, for example, may configure the managed mobile application to query the policy before accessing or using a computing resource. As an example, the framework may configure the managed mobile application to query the application policy in order to determine whether data may be copied to another mobile application at the mobile device. In some example implementations, the managed mobile application may only copy the data to other managed mobile applications at the mobile device. As another example, the framework may configure the managed mobile application to query the application policy in order to determine whether the mobile device may capture a screenshot of the managed mobile application. These and other examples will be appreciated with the benefit of this disclosure.

If the application policy permits the managed mobile application to access or use computing resource as intended (block 1416:Y), then the framework may permit the managed mobile application to carry out the intended action (block 1418). If, however, the application policy does not permit the managed mobile application to access or use the computing resource as intended (block 1418:N), then the framework may prevent the managed mobile application from carrying out the intended action (block 1420).

Mobile Application Management with Mobile Device Management

Although mobile application management (MAM) has been discussed in the context of an unmanaged device, aspects of the present disclosure may also be employed with respect to managed devices as well. An enterprise may utilize mobile device management (MDM) in conjunction with mobile application management to further control the operation of the mobile device. In particular, the mobile device may enroll with an MDM system to establish a managed relationship between the MDM system and the mobile device. Once the mobile device is enrolled, the MDM system may leverage the managed relationship to enforce policies, monitor the mobile device, push information to the mobile device, and the like.

In sum, the MDM system may obtain information about the mobile device that would otherwise be unavailable absent the managed relationship. Such information may correspond to device-level settings that are not discoverable or readable through applications at the mobile device. Such device-level settings may include PIN or password settings, encryption settings, network-related settings, and the like. Such information may also include information regarding the processes currently running at the mobile device and the mobile applications installed at the mobile device (e.g., the application inventory). The MDM system may further obtain additional or alternative types of information pertaining to the managed mobile device. The MDM system may compare the information obtained from the managed mobile device against various policies and take various actions in response.

With respect to a device PIN/password, the MDM system may obtain information that indicates whether the device is secured via a PIN/password, the complexity of the PIN/password, and the age of the PIN/password. Through the managed relationship, the MDM system may obtain information regarding the PIN/password settings of the device. The MDM system may compare this information to policies governing the use of device PINs/passwords. As an example, if a security policy indicates that the mobile device must be secured by a PIN/password and the information obtained from the mobile device indicates that the device PIN/password setting is not enabled, then the MDM system may push notifications to the managed mobile device indicating the security policy regarding device PINs/passwords. As another example, if the MDM system determines that the device PIN/password does not meet the complexity requirements of the security policy, then the MDM system may likewise push a notification to the managed mobile device indicating that a new, more complex PIN/password is required to comply with the security policy. As a further example, if the security policy indicates that device PINs/passwords must be changed periodically, then the MDM system may push a notification to the managed mobile device indicating the need to change the device PIN/password upon determining that the current device PIN/password has expired.

With respect to encryption settings, the MDM system may also obtain information that indicates whether the device has hardware encryption enabled. Through the managed relationship, the MDM system may enable hardware encryption at the managed mobile device upon determining that a security policy requires hardware encryption and that hardware encryption is not currently enabled at the mobile device. The MDM system may also set network-related settings at the managed mobile device through the managed relationship.

The MDM system may additionally obtain information regarding the processes currently running at the managed mobile device. The MDM system may compare the running processes against a list of malicious applications, programs, or processes in order to identify, e.g., malware at the managed mobile device. Through the managed relationship, the MDM system may kill any processes identified as malware or potentially malicious. The MDM system may also remove the corresponding malicious applications or programs through the managed relationship with the mobile device.

Similarly, the MDM system may obtain a list of applications installed at the managed mobile device. The MDM system may compare the list of installed applications to, e.g., an application whitelist or an application blacklist. The application whitelist may be a list of mobile applications permitted to be installed at the mobile device. If the list of installed applications includes an application that does not appear on the mobile application whitelist, then the MDM system may leverage the managed relationship to remove the application. The application blacklist may be a list of mobile applications prohibited from being installed at the mobile device. If the list of installed applications includes an application that appears on the mobile application blacklist, then the MDM system may similarly leverage the managed relationship to remove the application. It will be appreciated that the MDM system may additionally leverage the managed relationship to push mobile applications to the managed mobile device in order to control which mobile applications are installed at the mobile device. In view of this disclosure, it will also be appreciated that the MDM system may exert more robust control over the mobile applications installed at the mobile device. As described above, MAM may disable a mobile application installed at the mobile device upon determination that the application violates a policy. When MDM is used in conjunction with MAM, however, the mobile application may not only be disabled, it may be removed entirely from the mobile device. The MDM system may push other types of information to the managed mobile device. For example, the MDM system may leverage the managed relationship to push application updates or certificates to the mobile device. The certificates may be, e.g., X.509 device certificates.

The disclosures provided in this disclosure provide a number of technical advantages. In general, the approaches set forth above enable an enterprise to securely and strongly identify a mobile application regardless of mobile platform. The approaches set forth above also provide an automated way to verify the identity of mobile applications accessing potentially sensitive data such as authentication credentials, digital certificates, enterprise data, and the like. An enterprise implementing the approaches set forth above may also reduce the number of physical devices under its management by allowing individuals to use their personal devices to access enterprise resources. In this regard, an enterprise may avoid having to enroll an entire device into a mobile device management system, and may instead only enroll various mobile applications at a mobile device in a mobile application management system. These and other advantages will be appreciated with the benefit of the disclosures provided above.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computer-implemented method comprising:
   installing an application at a first location of a computing device, at least one token being embedded in the application;
   storing, at a second location of the computing device and separately from the application, application metadata comprising at least one corresponding token, wherein each of the at least one corresponding token corresponds to one of the at least one token embedded in the application;
   challenging the application to provide a response prior to granting the application access to a computing resource;
   obtaining the at least one corresponding token from the application metadata stored at the computing device;
   generating an expected response that is based, at least in part, on the at least one corresponding token obtained from the application metadata;
   comparing the expected response to the response received from the application; and
   either granting or denying the application access to the computing resource based on whether the expected response matches the response received.

2. The computer-implemented method of claim 1, wherein:
   challenging the application to provide the response comprises challenging the application responsive to receipt, from the application, of a request to access the computing resource.

3. The computer-implemented method of claim 1, wherein:
   challenging the application to provide the response comprises challenging the application responsive to a launch of the application at the computing device.

4. The computer-implemented method of claim 1, wherein:
   generating the expected response comprises generating an expected application signature for the application.

5. The computer-implemented method of claim 4, wherein:
   generating the expected application signature further comprises obtaining at least one first corresponding token from the application metadata.

6. The computer-implemented method of claim 5, wherein:
   generating the expected application signature further comprises deriving at least one second token from the application.

7. The computer-implemented method of claim 6, wherein:
   deriving the at least one second token comprises hashing a component of the application.

8. The computer-implemented method of claim 7, wherein:
   the component comprises one of a binary of the application, an icon of the application, or a framework of the application.

9. The computer-implemented method of claim 6, wherein:
   generating the expected application signature further comprises arranging, in a predetermined order, the at least one first corresponding token and the at least one second token.

10. The computer-implemented method of claim 4, further comprising:
    providing a nonce to the application;
    wherein generating the expected response further comprises generating an expected hash value based on the application signature and the nonce; and
    wherein comparing the expected response to the response received from the application comprises comparing the expected hash value to a hash value received from the application.

11. A computer-implemented method comprising:
    receiving, at an application installed at a first location of a computing device, a challenge to provide a response prior to obtaining access to a computing resource;
    generating, by the application, a response that is based, at least in part, on a token embedded in the application;
    providing, by the application, the response for comparison to an expected response that has been generated based, at least in part, on a corresponding token obtained from application metadata stored at a second location of the computing device separately from the application installed at the computing device, wherein the corresponding token obtained from the application metadata corresponds to the token embedded in the application; and
    obtaining, by the application, access to the computing resource responsive to a determination that the expected response matches the response provided by the application.

12. The computer-implemented method of claim 11, wherein:
    generating the response comprises generating, by the application, an application signature.

13. The computer-implemented method of claim 12, wherein:
    generating the application signature comprises extracting, by the application, the token embedded in the application.

14. The computer-implemented method of claim 13, wherein:
generating the application signature comprises deriving at least one second token from the application.

15. The computer-implemented method of claim 14 wherein:
deriving the at least one second token comprises hashing a component of the application; and
the component comprises one of a binary of the application, an icon of the application, or a framework of the application.

16. The computer-implemented method of claim 14, wherein:
generating the application signature comprises arranging, in a predetermined order, the token extracted from the application and at least one of the second tokens.

17. The computer-implemented method of claim 12, further comprising:
receiving a nonce; and
wherein generating the response further comprises generating a hash value based on the application signature and the nonce; and
wherein providing the response for comparison to the expected response comprises providing the hash value to an expected hash value.

18. A computer-implemented method comprising:
embedding a token in an application;
providing, to a computing device for storage at a first location of the computing device, application metadata comprising a corresponding token that corresponds to the token embedded in the application;
including, in the application, a management framework that configures the application to:
  (i) generate, in response to receiving a challenge, a response that is based, at least in part, on the token embedded in the application, and
  (ii) provide the response for comparison to an expected response that has been generated at the computing device based, at least in part, the corresponding token that has been obtained from the application metadata stored at the computing device; and
providing the application to the computing device for installation at a second location of the computing device and separately from the application metadata.

19. The computer-implemented method of claim 18, wherein:
the management framework configures the application to generate the response by generating an application signature based, at least in part, on the token embedded in the application.

20. The computer-implemented method of claim 19, wherein:
the management framework configures the application to generate the application signature by extracting the token embedded in the application and arranging, in a predetermined order, the token extracted from the application and at least one second token derived from the application.

* * * * *